US009773282B1

(12) United States Patent
Haffey et al.

(10) Patent No.: US 9,773,282 B1
(45) Date of Patent: Sep. 26, 2017

(54) METHOD AND SYSTEM FOR PROVIDING A SPENDING ANALYSIS DISPLAY DYNAMICALLY ADAPTED TO DEFINED CATEGORIES OF DAY AND/OR DATE

(71) Applicant: Intuit Inc., Mountain View, CA (US)

(72) Inventors: Jessie Haffey, Quincy, MA (US); Thinh Lam, Millbrae, CA (US); Lin Jiang, Palo Alto, CA (US); Ann Yeh, San Francisco, CA (US); Robin E. Florentine, Sunnyvale, CA (US); Vince Maniago, Sunnyvale, CA (US)

(73) Assignee: Intuit Inc., Mountain View, CA (US)

(*) Notice: Subject to any disclaimer, the term of this patent is extended or adjusted under 35 U.S.C. 154(b) by 112 days.

(21) Appl. No.: 14/698,975

(22) Filed: Apr. 29, 2015

(51) Int. Cl.
G07B 17/00 (2006.01)
G06Q 40/00 (2012.01)
G06F 17/30 (2006.01)

(52) U.S. Cl.
CPC ....... G06Q 40/12 (2013.12); G06F 17/30864 (2013.01)

(58) Field of Classification Search
CPC ....... G06Q 10/02; G06Q 20/40; G01C 21/343
USPC .......................... 705/5, 44, 417, 30; 701/410
See application file for complete search history.

(56) References Cited

U.S. PATENT DOCUMENTS

| 2002/0055818 | A1* | 5/2002 | Gaspard, II | G01C 21/343 701/410 |
| 2003/0120526 | A1* | 6/2003 | Altman | G06Q 10/02 705/5 |
| 2004/0117332 | A1* | 6/2004 | Himebaugh | G06Q 10/02 705/417 |
| 2005/0165683 | A1* | 7/2005 | Taylor | G06Q 20/40 705/44 |
| 2009/0030885 | A1* | 1/2009 | DePasquale | G06Q 10/02 |

* cited by examiner

Primary Examiner — Rokib Masud
(74) Attorney, Agent, or Firm — Hawley Troxell Ennis & Hawley LLP; Philip McKay

(57) ABSTRACT

A spending analysis display is provided that includes a spending analysis number associated with a defined Uber financial transaction category and that indicates to a user an average spending amount for the current time period category, such as a weekday or a weekend day, during a defined comparison timeframe, such as the last 30 days. The spending analysis number calculated and displayed varies according to the current time, and the determined time period category of the current time. Consequently, as one example, the spending analysis number calculated and displayed for a weekday, or work day, is likely different than the spending analysis number calculated and displayed on a weekend day, or non-work day.

50 Claims, 5 Drawing Sheets

METHOD AND SYSTEM FOR PROVIDING A SPENDING ANALYSIS DISPLAY DYNAMICALLY ADAPTED TO DEFINED CATEGORIES OF DAY AND/OR DATE

BACKGROUND

Currently, several types of financial management systems are available to help an individual user obtain the user's financial data, process/analyze the user's financial data, and/or generate various customized financial reports and displays for the user.

Herein, a financial management system can be, but is not limited to, any data management system that gathers financial data, including financial transactional data, from one or more sources, such as financial accounts and financial institutions, and/or has the capability to analyze and categorize at least part of the financial data.

Current financial management systems are typically software applications and/or web-based services, which, along with a parent computing system, server system, or device, help individuals/users manage their finances by providing a centralized interface with banks, credit card companies, asset account providers, mortgage companies, retirement account providers, and other financial and asset management institutions and/or accounts, for identifying, processing, storing, and categorizing user financial transactions. Currently, financial management systems typically obtain financial transaction data, such as payee identification, payment amount, date of the transaction, time of transaction, etc., via communication with banks, credit card providers, or other financial institutions, using data entry, and/or links to databases, and/or screen scraping technology, and/or electronic data transfer systems, such as the Open Financial Exchange (OFX) specification, and/or various other systems and mechanisms for obtaining and transferring financial transaction data.

Using some financial management systems, the financial transaction data, payee identification, payment amount, date of the transaction, various descriptions, tags and/or labels, and/or other identifying data is used by the financial management system to identify, categorize, and/or tag individual financial transactions as a particular type of income or expense, to generate various financial reports, and to create an overview of the user's financial situation based on input from multiple, and preferably all, available sources of financial information/data regarding a user.

While currently available financial management systems have proven to be effective and powerful tools, many users of financial management systems desire, and would greatly benefit from, very basic analysis and displays showing how the user is spending their money and what spending is in the users' control, i.e., is want-based, or discretionary spending, as opposed to spending that is not really under the user's control, i.e., is need-based, or non-discretionary spending. However, it is often the case that the level of complexity, sophistication, and "granularity" of the categorizations, analysis, and displays associated with traditional financial management systems actually provide a user too much information and require far more interaction and mental analysis than the user actually wants to devote to managing their finances. In addition to being overly complicated, data and reports generated by currently available financial management systems are often presented to the user in relatively static, and unengaging, reports and displays that provide little or no opportunity for user interaction with the data and/or user modification.

In addition, data and reports generated by currently available financial management systems often fail to take into account periodically repeating variations in user spending, and in particular, variations in user spending that naturally occur over the course of a day, a week, a month, a quarter, a year, or any defined period of time, based on the hours and days of the week the user works, seasonal employment and spending, and/or other particulars of an individual user's life and/or vocation that can cause periodically repeating variations in the user's spending. Given this fact, it follows that currently available financial management systems do not provide simple, user friendly, intuitive, and interactive spending analysis/tracking displays that are dynamically adjusted/adapted to the current time period and periodically repeating variations in user spending. As a specific illustrative example, currently available financial management systems do not provide simple, user friendly, intuitive, and interactive spending analysis/tracking displays that take into account whether the current time period is a weekday/work day or a weekend day/non-work day. This is less than ideal given that most user's spending habits are quite different on weekdays/work days than on weekend days/non-work days.

This long standing problem in the technical fields of financial management, data display, and user experience has at least five significant undesirable results. First many users simply stop using the financial management system because, as noted, the process does not engage the user, and many users do not know how, or do not want to devote the time and energy required, to obtain information that is meaningful to the user.

Second, using currently available financial management systems, in order to modify, or otherwise enter data associated with specific financial transactions, such as categorization data, the user must often interact with multiple screens and enter data through a keyboard, or other input device, that is often burdensome and difficult to use. In addition, in a world rapidly becoming dominated by mobile systems, such as smart-phones, having to scroll through and interact with large amounts of often undesired analysis data and categorizations to determine a user's recent spending history and habits is not only burdensome, but is actually prone to erroneous data entry and analysis. This is because while a "qwerty" keyboard can be made to fit in a space less than 2" wide, that doesn't make it easy or efficient to use. Consequently, not only is the user not actively engaged in the categorization process, and/or required to analyze their spending situation, but the data displayed and processed by currently available financial management systems is often not up to date, or is incomplete.

Third, currently available financial management systems often employ a hundred or more financial transaction categories, often defined by other parties, such as the IRS, and therefore users lose track of which financial transactions represent controllable spending choices, and the consequences of those spending choices, in the "haystack" of financial transactions categorized in one of the hundred or more financial transaction categories that the user did not even define.

Fourth, the displays provided by currently available financial management systems typically are not relevant or intuitive and do not actively engage the user in the process of analyzing, and/or modifying their spending choices. Therefore the user is not encouraged to become an active participate in understanding and controlling/modifying the user's spending choices.

Finally, as noted, currently available financial management systems fail to take into account periodically repeating variations in user spending, and in particular, variations in user spending that naturally occur over the course of a day, a week, a month, a quarter, a year, or any defined period of time based on the hours and days of the week the user works, seasonal employment and spending, and/or other particulars of an individual user's life and career that can cause periodically repeating variations in user spending. Given this fact, it follows that the displays provided by currently available financial management systems currently do not provide simple, user friendly, intuitive, and interactive spending analysis/tracking displays that are dynamically adjusted/adapted to reflect periodically repeating variations in user spending.

The inability of prior art financial management systems to negotiate these technical hurdles has historically caused many consumers/users to lose track of their spending and to fail to recognize those spending habits they can change, and those that are largely not under their control. In addition, by failing to provide simple, user friendly, intuitive, and interactive spending analysis/tracking displays that are dynamically adjusted/adapted to reflect periodically repeating variations in user spending, currently available financial management systems fail to place users on alert as to times when they are doing most of their discretionary spending, and to thereby help users control unwanted discretionary spending by making them aware of times when they need to be more sensitive to their spending.

As a result of the situation described above, both users and providers of financial management systems are currently detrimentally affected by this long standing problem in the technical fields of financial management, data display, and user experience.

What is needed is a method and system for providing users an intuitive and interactive spending analysis display that is dynamically adapted to the display day and/or date and that allows users to intuitively and easily see their discretionary and non-discretionary spending, to categorize undetermined financial transactions in a relevant and engaging way, and provide simple, user friendly, intuitive, and interactive spending analysis/tracking that is dynamically adjusted/adapted to reflect periodically repeating variations in user spending.

SUMMARY

Embodiments of the present disclosure address some of the shortcomings associated with prior art financial management system displays by providing users an intuitive and interactive spending analysis display showing relative spending in high level financial transaction categories, or Uber financial transaction categories, such as wants/discretionary spending and needs/non-discretionary spending, in a single and simple user interface display that is dynamically adapted to the display time to provide a spending analysis/tracking number that is dynamically adjusted/adapted to reflect periodically repeating variations in user spending.

In one embodiment, a spending analysis display is provided that includes a spending analysis number associated with a defined Uber financial transaction category and that indicates to a user an average spending amount for the current time period category, such as a weekday or a weekend day, during a defined comparison timeframe, such as the last 30 days. The spending analysis number calculated and displayed varies according to the current time, and the determined time period category of the current time. Consequently, as one example, the spending analysis number calculated and displayed for a weekday, or work day, is likely different than the spending analysis number calculated and displayed on a weekend day, or non-work day.

In one embodiment, one or more first category time periods, such as, but not limited to, work days, and one or more second category time periods, distinct from the first category time periods, such as, but not limited to, non-work days, and a comparison timeframe, such as, but not limited to, the previous 30 days, are defined.

In one embodiment, the total number of first category time periods, such as, but not limited to, the total number of work days, and the total number of second category time periods, such as, but not limited to, the total number of weekend days, within the comparison timeframe, such as, but not limited to, the previous 30 days, are determined.

In one embodiment, a first Uber financial transaction category is defined such as, but not limited to, a discretionary, or wants, spending financial transaction category, and financial transaction data representing one or more financial transactions associated with a user conducted during the comparison timeframe, such as, but not limited to, the previous 30 days, is obtained.

In one embodiment, financial transactions associated with a user conducted during the first category time periods, such as, but not limited to, work days, in the defined comparison timeframe, such as, but not limited to, the previous 30 days, and that are classified in the first Uber financial transaction category, such as, but not limited to, discretionary spending, are identified and the total cumulative amount of the these financial transactions is determined.

In one embodiment, financial transactions associated with a user conducted during the second category time periods, such as, but not limited to, non-work days, in the defined comparison timeframe, such as, but not limited to, the previous 30 days, and that are classified in the first Uber financial transaction category, such as, but not limited to, discretionary spending, are identified and the total cumulative amount of the these financial transactions is also determined.

In one embodiment, the average amount spent in the first Uber financial transaction category, such as, but not limited to, discretionary spending, in the first category time periods, such as, but not limited to, work days, in the defined comparison timeframe, such as, but not limited to, the previous 30 days, is calculated, as is the average amount spent in the first Uber financial transaction category, such as, but not limited to, discretionary spending, in the second category time periods, such as, but not limited to, non-work days, in the defined comparison timeframe, such as, but not limited to, the past 30 days.

In one embodiment, a determination is made as to whether a current time is in the first category time period, such as, but not limited to, a work day, or the second category time period, such as, but not limited to, a non-work day, for the user. In one embodiment, a spending analysis display is then generated including a first Uber financial transaction category analysis display region, such as, but not limited to, a discretionary financial transaction category analysis display region.

In one embodiment, if the current time is determined to be in the first category time period for the user, such as, but not limited to, a work day, the first Uber financial transaction category analysis display region includes a first Uber financial transaction category analysis number, such as, but not limited to, a discretionary spending analysis number, calculated based on the average amount spent in the first Uber financial transaction category, such as, but not limited to, discretionary spending, in the first category time periods, such as, but not limited to, work days, in the defined comparison timeframe, such as, but not limited to, the previous 30 days.

In one embodiment, if the current time is determined to be in the second category time period for the user, such as, but not limited to, non-work days, the first Uber financial transaction category analysis display region includes a first Uber financial transaction category analysis number, such as, but not limited to, a discretionary spending analysis number, calculated based on the average amount spent in the first Uber financial transaction category, such as, but not limited to, discretionary spending, in the second category time periods, such as, but not limited to, non-work days, in the defined comparison timeframe, such as, but not limited to, the previous 30 days.

In one embodiment, the spending analysis display is then made accessible to the user via a display screen of a user computing system.

The embodiments of a method and system for providing a spending analysis display dynamically adapted to defined categories of day and/or date discussed herein provide a solution to the long standing problem of failure to take into account periodically repeating variations in user spending, and in particular, variations in user spending that naturally occur over the course of a day, a week, a month, a quarter, a year, or any defined period of time, based on the hours and days of the week the user works, seasonal employment and spending, and/or other particulars of an individual user's life and career that can cause periodically repeating variations in user spending.

The embodiments of a method and system for providing a spending analysis display dynamically adapted to defined categories of day and/or date discussed herein solve the problem by providing users an intuitive and interactive spending analysis display that is dynamically adapted to the display day and/or date and that allows users to intuitively and easily see their discretionary and non-discretionary spending, to categorize undetermined financial transactions in a relevant and engaging way, and provides, user friendly, intuitive, and interactive spending analysis/tracking that is dynamically adjusted/adapted to reflect periodically repeating variations in user spending.

In addition, embodiments of the method and system for providing a spending analysis display dynamically adapted to defined categories of day and/or date discussed herein allow consumers/users to easily and simply track of their spending and to recognize those spending habits they can change, and those that are largely not under their control. In addition, embodiments of the method and system for providing a spending analysis display dynamically adapted to defined categories of day and/or date discussed herein provide simple, user friendly, intuitive, and interactive spending analysis/tracking displays that are dynamically adjusted/adapted to reflect periodically repeating variations in user spending. to place users on alert as to times when they are doing most of their discretionary spending, and to thereby help users control unwanted discretionary spending by making them aware of times when they need to be more sensitive to their spending.

Therefore, embodiments of the method and system for providing a spending analysis display dynamically adapted to defined categories of day and/or date discussed herein significantly improve the technical fields of data entry/selection and user experience. Therefore, implementations of embodiments of the present disclosure represent a significant improvement to the field of user experience and, in particular, efficient use of human and non-human resources.

In addition, by eliminating the necessity of performing unnecessary analysis and displaying detailed, and often undesired, reports and data, there is less data entry, less processing of data, and fewer errors in entered data. Consequently, using the method and system for providing a spending analysis display dynamically adapted to defined categories of day and/or date discussed herein, fewer processor cycles are utilized, memory utilization is reduced, and less communications bandwidth is utilized to relay data to and from backend systems. As a result, computing systems, and particularly mobile computing systems, are transformed into faster, more efficient, and more effective computing systems by implementing embodiments of the method and system for providing a spending analysis display dynamically adapted to defined categories of day and/or date discussed herein.

The various embodiments of the disclosure and their associated benefits also improve the technical field of financial management by providing users with a relevant and simple spending and financial display while requiring minimal user input. In addition, embodiments of the present disclosure allow the financial management system to offer a more relevant analysis of a user's financial situation. Further, the increased relevancy of the data provided using embodiments of the present disclosure increase the chances that a user will continue using the financial management system.

As a result, using implementations of embodiments of the present disclosure, the fields of financial management, financial data processing, data entry, data display, data processing, and user experience are significantly improved.

Figure 1:
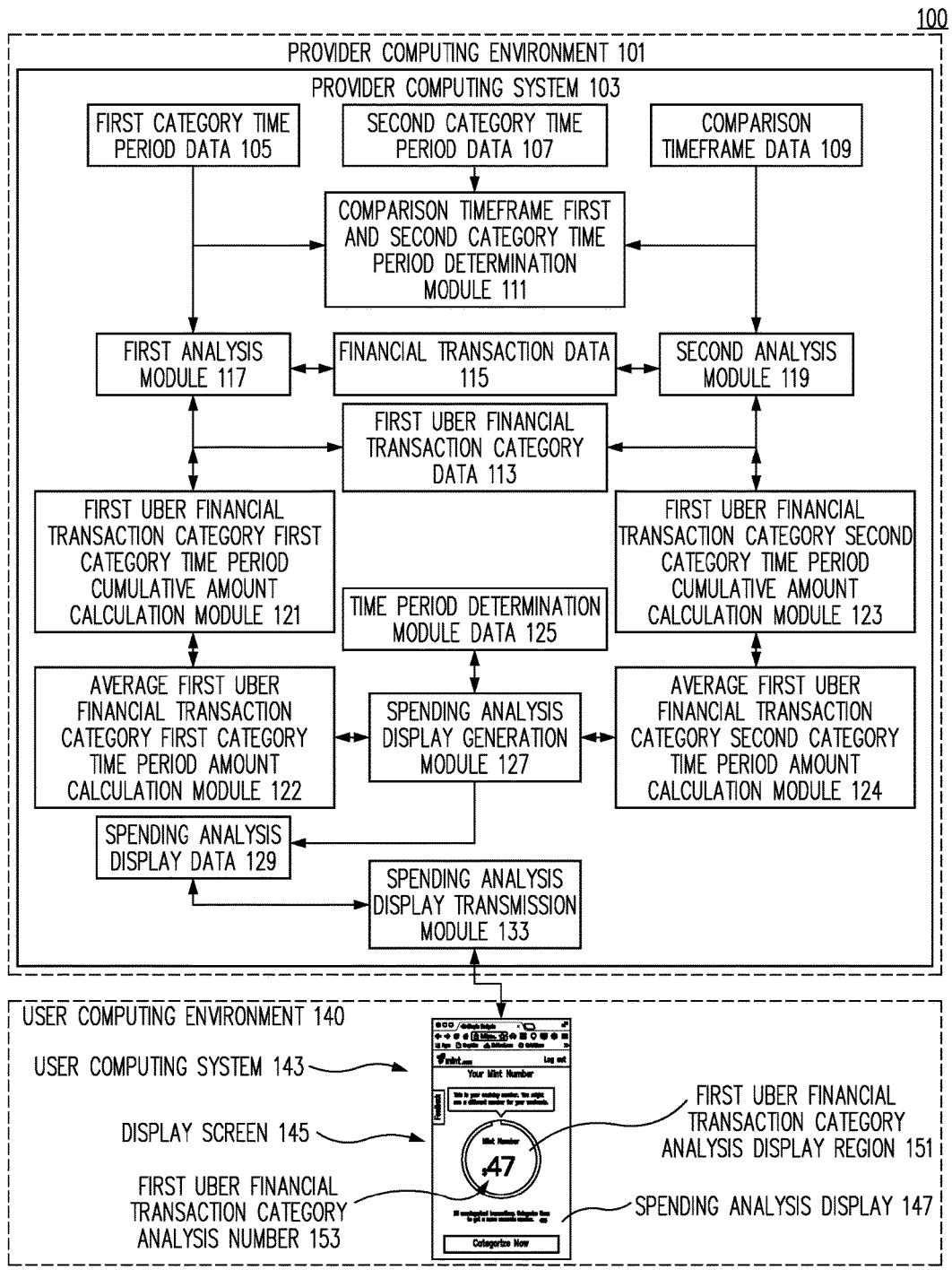
FIG. 1 is a block diagram of architecture for providing a method and system for providing a spending analysis display dynamically adapted to defined categories of day and/or date in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

Herein, a financial management system can be, but is not limited to, any data management system implemented on a computing system, accessed through one or more servers, accessed through a network, accessed through a cloud, and/or provided through any system or by any means, as discussed herein, and/or as known in the art at the time of filing, and/or as developed after the time of filing, that gathers financial data, including financial transactional data, from one or more sources and/or has the capability to analyze and categorize at least part of the financial data.

As used herein, the term financial management system includes, but is not limited to the following: computing system implemented, and/or online, and/or web-based, personal and/or business financial management systems, services, packages, programs, modules, or applications; computing system implemented, and/or online, and/or web-based, personal and/or business tax preparation systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filling or as developed later.

Specific examples of financial management systems include, but are not limited to the following: Quicken™, available from Intuit, Inc. of Mountain View, Calif.; Quicken On-Line™, available from Intuit, Inc. of Mountain View, Calif.; QuickBooks™, available from Intuit, Inc. of Mountain View, Calif.; QuickBooks On-Line™, available from Intuit, Inc. of Mountain View, Calif.; Mint™, available from Intuit, Inc. of Mountain View, Calif.; Mint On-Line™, available from Intuit, Inc. of Mountain View, Calif.; and/or various other financial management systems discussed herein, and/or known to those of skill in the art at the time of filing, and/or as developed after the time of filing.

As used herein, the terms "computing system," "computing device," and "computing entity," include, but are not limited to, the following: a server computing system; a workstation; a desktop computing system; a mobile computing system, including, but not limited to, smart phones, portable devices, and/or devices worn or carried by a user; a database system or storage cluster; a virtual asset; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms "computing system" and "computing entity," can denote, but are not limited to the following: systems made up of multiple virtual assets, server computing systems, workstations, desktop computing systems, mobile computing systems, database systems or storage clusters, switching systems, routers, hardware systems, communications systems, proxy systems, gateway systems, firewall systems, load balancing systems, or any devices that can be used to perform the processes and/or operations as described herein.

Herein, the terms "mobile computing system" and "mobile device" are used interchangeably and include, but are not limited to the following: a smart phone; a cellular phone; a digital wireless telephone; a tablet computing system; a notebook computing system; any portable computing system; a two-way pager; a Personal Digital Assistant (PDA); a media player; an Internet appliance; any computing system worn or carried by a user; or any other movable/mobile device and/or computing system that includes components that can execute all, or part, of any one of the processes and/or operations as described herein.

Herein, the term "production environment" includes the various components, or assets, used to deploy, implement, access, and use, a given application as that application is intended to be used. In various embodiments, production environments include multiple computing systems and/or assets that are combined, communicatively coupled, virtually and/or physically connected, and/or associated with one another, to provide the production environment implementing the application.

As specific illustrative examples, the assets making up a given production environment can include, but are not limited to, the following: one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known, "trusted" environments or unknown, "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, the following: virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing can be implemented as one or more virtual assets.

In one embodiment, two or more assets, such as computing systems and/or virtual assets, and/or two or more computing environments are connected by one or more communications channels including but not limited to, Secure Sockets Layer (SSL) communications channels and various other secure communications channels, and/or distributed computing system networks, such as, but not limited to the following: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user experience" includes not only the data entry process, but also other user experience features provided or displayed to the user such as, but not limited to the following: interfaces; images; backgrounds; avatars; highlighting mechanisms; icons; and any other features that individually, or in combination, create a user experience, as discussed herein, and/or as known in the art at the time of filing, and/or as developed after the time of filing.

Herein, the term "party," "user," "user consumer," and "customer" are used interchangeably to denote any party and/or entity that interfaces with, and/or to whom information is provided by, the method and system for providing a spending analysis display dynamically adapted to defined categories of day and/or date described herein, and/or a person and/or entity that interfaces with, and/or to whom information is provided by, the method and system for providing a spending analysis display dynamically adapted to defined categories of day and/or date described herein, and/or a legal guardian of person and/or entity that interfaces with, and/or to whom information is provided by, the method and system for providing a spending analysis display dynamically adapted to defined categories of day and/or date described herein, and/or an authorized agent of any party and/or person and/or entity that interfaces with, and/or to whom information is provided by, the method and system for providing a spending analysis display dynamically adapted to defined categories of day and/or date described herein. For instance, in various embodiments, a user can be, but is not limited to, a person, a commercial entity, an application, a service, and/or a computing system.

Method and System Environment

Embodiments of the present disclosure address some of the shortcomings associated with prior art financial management system displays by providing users an intuitive and interactive spending analysis display showing relative spending in high level financial transaction categories, or Uber financial transaction categories, such as wants/discretionary spending and needs/non-discretionary spending, in a single and simple user interface display that is dynamically adapted to the display time to provide a spending analysis/tracking number that is dynamically adjusted/adapted to reflect periodically repeating variations in user spending.

In one embodiment, a spending analysis display is provided that includes a spending analysis number associated with a defined Uber financial transaction category and that indicates to a user an average spending amount for the current time period category, such as a weekday or a weekend day, during a defined comparison timeframe, such as the last 30 days. The spending analysis number calculated and displayed varies according to the current time, and the determined time period category of the current time. Consequently, as one example, the spending analysis number calculated and displayed for a weekday, or work day, is likely different than the spending analysis number calculated and displayed on a weekend day, or non-work day.

In accordance with one embodiment, one or more first category time periods are defined.

In various embodiments, the one or more first category time periods represent time periods of a first type for the user, such as, but not limited to, time periods when the user is working, awake, traveling, or any other time periods distinguished from other time periods, such as the one or more second category time periods discussed below, by a particular event or activity the given user engages in during the one or more first category time periods. In various embodiments, the one or more first category time periods are defined by the particular user; and/or the method and/or system for providing a spending analysis display dynamically adapted to defined categories of day and/or date; and/or the provider of the method/system for providing a spending analysis display dynamically adapted to defined categories of day and/or date; and/or any other party.

In various embodiments, the one or more first category time periods can be, but are not limited to, specified hours of the day; specified hours of a specified day; a specified day; specified days of the week; specified days of a specified week; specified days of one or more specified weeks; specified days of a month; specified days of a specified month; specified weeks of a month; specified days of one or more specified months; specified weeks of one or more specified months; a specified month; one or more specified months; a specified month of a specified year; one or more specified months of a specified year; a specified month of one or more specified years; one or more specified months of one or more specified years; a specified year; one or more specified years; and/or any other time period or timeframe discussed herein, and/or as known in the art at the time of filing, and/or as developed/determined after the time of filing.

As one non-limiting specific illustrative example of one embodiment, work days, working hours, or weekdays, are defined as first category time periods.

In one embodiment, once the one or more first category time periods are defined, first category time period data is generated representing the defined one or more first category time periods.

In accordance with one embodiment, one or more second category time periods, distinct from the first category time periods, are defined.

In various embodiments, the one or more second category time periods represent time periods of a second type for the user, that are distinct from the one or more first category time periods, such as, but not limited to, time periods when the user is not working, asleep, at home, or any other time periods distinguished from the one or more first category time periods by a particular event or activity the given user engages in during the one or more second category time periods. In various embodiments, the one or more second category time periods are defined by the particular user; and/or the method and/or system for providing a spending analysis display dynamically adapted to defined categories of day and/or date; and/or the provider of the method/system for providing a spending analysis display dynamically adapted to defined categories of day and/or date; and/or any other party.

In various embodiments, the one or more second category time periods can be, but are not limited to, specified hours of the day; specified hours of a specified day; a specified day; specified days of the week; specified days of a specified week; specified days of one or more specified weeks; specified days of a month; specified days of a specified month; specified weeks of a month; specified days of one or more specified months; specified weeks of one or more specified months; a specified month; one or more specified months; a specified month of a specified year; one or more specified months of a specified year; a specified month of one or more specified years; one or more specified months of one or more specified years; a specified year; one or more specified years; and/or any other time period or timeframe discussed herein, and/or as known in the art at the time of filing, and/or as developed/determined after the time of filing.

As one non-limiting specific illustrative example of one embodiment, non-work days, non-work hours, or weekend days, are defined as second category time periods.

In one embodiment, once the one or more second category time periods are defined, second category time period data is generated representing the defined one or more second category time periods.

In one embodiment, a comparison timeframe is defined. In one embodiment, the comparison timeframe includes one or more first category time periods and/or one or more second category time periods.

In various embodiments, comparison timeframe is the timeframe that is to be used to calculate various intermediate values and quantities and then eventually determine spending analysis numbers presented to the user in one or more spending analysis displays. As discussed below, only financial transaction data representing financial transactions conducted during the defined comparison timeframe is used to calculate various intermediate values and quantities and then eventually determine spending analysis numbers presented to the user in one or more spending analysis displays.

In various embodiments, the comparison timeframe is defined by the particular user; and/or the method and/or system for providing a spending analysis display dynamically adapted to defined categories of day and/or date; and/or the provider of the method/system for providing a spending analysis display dynamically adapted to defined categories of day and/or date; and/or any other party.

In various embodiments, the comparison timeframe can be, but is not limited to, specified hours of the day; specified hours of a specified day; a specified day; specified days of the week; specified days of a specified week; specified days of one or more specified weeks; specified days of a month; specified days of a specified month; specified weeks of a month; specified days of one or more specified months; specified weeks of one or more specified months; a specified month; one or more specified months; a specified month of a specified year; one or more specified months of a specified year; a specified month of one or more specified years; one or more specified months of one or more specified years; a specified year; one or more specified years; and/or any other time period or timeframe discussed herein, and/or as known in the art at the time of filing, and/or as developed/determined after the time of filing.

In one embodiment, the comparison timeframe is selected so that the comparison timeframe is a shifting timeframe window such that the comparison timeframe is adapted each day, or new first or second category time period, to reflect the new and updated comparison timeframe. In this way, the comparison timeframe is continuously evolving/shifting to represent the latest data and to determine spending analysis numbers presented to the user in one or more spending analysis displays on a dynamically evolving/shifting basis.

Continuing with the specific illustrative example set forth above, the previous 30 days is defined as the comparison timeframe. In one embodiment, the previous 30 days is selected so that the comparison timeframe is de facto a shifting timeframe window so that each day the previous 30 days is redefined and the spending analysis numbers presented to the user in one or more spending analysis displays are calculated on a dynamically evolving/shifting basis. For instance, if the comparison timeframe is defined as the previous 30 days starting on the $10^{th}$ of May, then on the $10^{th}$ of May the comparison timeframe is April 10th thru May 10th. However, on May 11th, the comparison timeframe is shifted to April 11th thru May 11th.

In one embodiment, once the comparison timeframe is defined, comparison timeframe data is generated representing the defined comparison timeframe.

In one embodiment, a comparison timeframe first category time period number is calculated. In one embodiment, the comparison timeframe first category time period number is calculated by determining the number of first category time periods that occurred in the defined comparison timeframe.

Continuing with the specific illustrative example set forth above, in one embodiment, the comparison timeframe first category time period number is calculated by determining the number of work days, or weekdays, in the previous 30 days. For this specific example, assume there were 20 work days/weekdays in the past 30 days.

In one embodiment, once the comparison timeframe first category time period number is calculated, comparison timeframe first category time period number data is generated representing the calculated comparison timeframe first category time period number.

In one embodiment, a comparison timeframe second category time period number is calculated. In one embodiment, the comparison timeframe second category time period number is calculated by determining the number of second category time periods that occurred in the defined comparison timeframe.

Continuing with the specific illustrative example set forth above, in one embodiment, the comparison timeframe second category time period number is calculated by determining the number of non-work days, or weekend days, in the previous 30 days. For this specific example, assume there were 10 non-work/weekend days in the past 30 days.

In one embodiment, once the comparison timeframe second category time period number is calculated, comparison timeframe second category time period number data is generated representing the calculated comparison timeframe second category time period number.

In one embodiment, a first Uber financial transaction category is defined.

In various embodiments, financial transaction categories are defined that represent manually or automatically applied financial transaction categories used to categorize and process various financial transactions associated with the user. In various embodiments, the financial transaction categories are defined by the provider of the method and system for providing a spending analysis display dynamically adapted to defined categories of day and/or date. In other embodiments, the financial transaction categories are defined by one or more financial management systems such as, but not limited to, any of the financial management systems as discussed herein, and/or as known in the art at the time of filing, and/or as developed after the time of filing.

Herein, a financial management system can be, but is not limited to, any data management system that gathers financial data, including financial transactional data, from one or more sources, such as financial accounts and financial institutions, and/or has the capability to analyze and categorize at least part of the financial data.

As discussed above, current financial management systems are typically software applications and/or web-based services, which, along with a parent computing system, server system, or device, help individuals/users manage their finances by providing a centralized interface with banks, credit card companies, asset account providers, mortgage companies, retirement account providers, and other various financial and asset management institutions and/or accounts, for identifying, processing, storing, and categorizing user financial transactions. Currently, financial management systems typically obtain financial transaction data, such as payee identification, payment amount, date of the transaction, time of transaction, etc., via communication with banks, credit card providers, or other financial institutions, using data entry, and/or links to databases, and/or screen scraping technology, and/or electronic data transfer systems, such as the Open Financial Exchange (OFX) specification, and/or various other systems for obtaining and transferring financial transaction data.

Using some financial management systems, the financial transaction data, payee identification, payment amount, date of the transaction, various descriptions, tags and/or labels, and/or other identifying data is used by the financial management system to identify, categorize, and/or tag individual financial transactions as a particular type of income or expense, to generate various financial reports, and to create an overview of the user's financial situation based on input from multiple, and preferably all, available sources of financial information/data regarding a user. To this end, many financial management systems define their own financial transaction categories.

In some embodiments, the financial transaction categories are defined by outside agencies such as, but not limited to, the Internal Revenue Service (IRS) or other state and local tax agencies.

In various embodiments, the financial transaction categories defined include, but are not limited to, one or more the following: entertainment categories, such as arts, amusement, music, movies and DVDs, newspaper and magazines, etc.; shopping categories, such as clothing, books, electronics and software, hobbies, sporting goods, etc.; personal care categories, such as hair, spa and massage, etc.; health and fitness categories, such as gym, sports, etc.; kids categories, such as toys, kid activities, allowance, etc.; food and dining categories, such as coffee, fast food, restaurants, alcohol, etc.; gift and donation categories, such as, gifts, charity, etc.; pet and pet care categories, such as, pet grooming, etc.; financial transaction categories, such as, life insurance, financial advisor fees, accountant fees, etc.; home categories, such as, furnishings, lawn and garden, home improvement, television, cable, home phone, Internet, mobile phone, etc.; travel categories, such as, air travel, hotel expenses, rental car and taxi expenses, vacation, etc.; uncategorized/undetermined transactions such as, cash ATM transactions, check transactions, transfer transactions, credit card payments, etc.; investment categories, such as, deposits, withdrawals, dividends and capital, buy, sell, etc.; and/or any other financial transaction categories defined and/or discussed herein, and/or as known in the art at the time of filing, and/or as developed after the time of filing.

In one embodiment, at least one Uber financial transaction category, a first Uber financial transaction category, is defined. In various embodiments, the Uber financial transaction categories are broad financial transaction categories that include, or encompass, one or more of the financial transaction categories discussed above.

In one embodiment, the Uber financial transaction categories are defined in pairs of Uber financial transaction categories that are representative of a broad categorization of various subsets of financial transaction categories.

For instance, in one specific example, the pair of Uber financial transaction categories is a "wants" Uber financial transaction category representing discretionary spending financial transactions and a "needs" Uber financial transaction category representing non-discretionary financial transactions. In this specific illustrative example, the Uber financial transaction categories are used to distinguish between financial transactions, and associated financial transaction categories, over which the user has control, i.e., that are associated with spending that is not required, but rather represents desired spending on a "wanted" item or service, as opposed to financial transactions, and associated financial transaction categories, over which the user has no control, i.e., that are associated with spending that is required and is not optional, such as utilities, rent, mortgage, etc.

In various embodiments, the first Uber financial transaction category can be either the "wants" Uber financial transaction category or the "needs" Uber financial transaction category.

As noted above, one long standing problem associated with traditional financial management systems displays is the inability to present users their financial information in an efficient, relevant, intuitive, interactive, and dynamic way that is of practical use. However, by dividing the user's spending transactions between relatively few, in one embodiment only one, Uber financial transaction categories, the user is provided a straightforward display illustrating, in this specific illustrative example, how much the user is spending on items and services that are needed, and therefore not discretionary, versus how much the user is spending on items and services that are not needed, but which are desired.

Another example of pairs of Uber financial transaction categories include, but are not limited to, a "good" and "bad" spending Uber financial transaction category pair through which the users financial transactions are divided between financial transactions representing good spending habits and financial transactions representing bad spending habits. In various embodiments, the first Uber financial transaction category can be either the "good" spending Uber financial transaction category or the "bad" spending Uber financial transaction category.

Another example of pairs of Uber financial transaction categories include, but are not limited to, a "discretionary" and "non-discretionary" Uber financial transaction category pair. This Uber financial transaction category pair is very similar to the wants and needs pair discussed above. In various embodiments, the first Uber financial transaction category can be either the "discretionary" Uber financial transaction category or the "non-discretionary" Uber financial transaction category.

Another example of pairs of Uber financial transaction categories include, but are not limited to, a "worth it" and "not worth it" Uber financial transaction category pair. This Uber financial transaction category pair is used to divide financial transactions into those that are deemed worth the expenditure and those that are deemed not worth the expenditure. This Uber financial transaction category pairing allows a user to examine, and presumably learn from, previous spending habits. In various embodiments, the first Uber financial transaction category can be either the "worth it" Uber financial transaction category or the "not worth it" Uber financial transaction category.

Another example of pairs of Uber financial transaction categories include, but are not limited to, a "would repeat" and "would not repeat" Uber financial transaction category pair. This Uber financial transaction category pair is similar to the "worth it" and "not worth it" financial transaction category pair discussed above. In various embodiments, the first Uber financial transaction category can be either the "would repeat" Uber financial transaction category or the "would not repeat" Uber financial transaction category.

Other examples of pairs of Uber financial transaction categories include any Uber financial transaction categories as discussed herein, and/or as known in the art at the time of filing, and/or as developed after the time of filing. In various embodiments, the first Uber financial transaction category can be any Uber financial transaction category as discussed herein, and/or as known in the art at the time of filing, and/or as developed after the time of filing.

In one embodiment, once the first Uber financial transaction category is defined, first Uber financial transaction category data representing the defined first Uber financial transaction category is generated.

In one embodiment, once the first Uber financial transaction category is defined and first Uber financial transaction category data is generated, a subset of the financial transaction categories is mapped to the first Uber financial transaction category.

This mapping of the one or more financial transaction categories to the first Uber financial transaction category represents the fact that some defined financial transaction categories, such as, for instance, the financial transaction categories of rent, utilities, car repair, insurance payments, etc. are almost always identifiable as, for example, needs-based, or non-discretionary, financial transactions, and therefore should always be mapped to the needs/non-discretionary Uber financial transaction category and never mapped to the wants/discretionary Uber financial transaction category. In contrast, some defined financial transaction categories, such as entertainment, pet grooming, vacation, etc., are almost always wants-based financial transactions, and therefore should always be mapped to the wants Uber financial transaction category and never to the needs/non-discretionary Uber financial transaction category.

However, some financial transaction categories, and associated financial transactions, are either uncategorized or are categorized in financial transaction categories which are not clearly mapped to any Uber financial transaction categories. For instance, the financial transaction categories shopping, clothing, personal care, hair, kids, kids' activities, allowance, food and dining, pets, home, home furnishings, ATM transactions, check transactions, withdraw transaction, etc., are mapped to either the needs/non-discretionary Uber financial transaction category or the wants/discretionary Uber financial transaction category, depending on the specific financial transaction. As an illustrative example, a given financial transaction categorized as clothing could either be a purchase of business attire necessary to keep one's job, in which case it would clearly be mapped to the needs/non-discretionary Uber financial transaction category, or it could represent a purchase of a new party dress or hobby related clothing which would most likely be mapped to the wants/discretionary Uber financial transaction category.

Consequently, in one embodiment, those financial transaction categories, and associated financial transactions, that are clearly, or most likely, related to purchases associated with the first Uber financial transaction category are automatically mapped to the first Uber financial transaction category and those financial transaction categories, and associated financial transactions, that are clearly, or most likely, related to purchases associated another financial transaction category are not automatically mapped to the first Uber financial transaction category. In addition, those financial transactions that are either not categorized, or are categorized using financial transaction categories that are not clearly associated with the first Uber financial transaction category, or any Uber financial transaction category, are designated uncategorized/undetermined financial transactions and are therefore not mapped to the first Uber financial transaction category, but are instead accumulated in a set of uncategorized/undetermined financial transaction data representing the uncategorized/undetermined financial transactions.

In some embodiments, the initial mapping of the financial transaction categories to the first Uber financial transaction category is performed by the provider of the method and system for providing a spending analysis display dynamically adapted to defined categories of day and/or date. In some embodiments, the initial mapping of the financial transaction categories to the first Uber financial transaction category performed by the provider of the method and system for providing a spending analysis display dynamically adapted to defined categories of day and/or date can then be modified by the user, or as a result of feedback received during the operation of the method and system for providing a spending analysis display dynamically adapted to defined categories of day and/or date.

In other embodiments, the mapping of the financial transaction categories to the first Uber financial transaction category is performed by the user and this initial mapping can be modified by the user for various reasons. For instance, while financial transactions related to purchasing coffee might be initially mapped by either the user or the provider of the method and system for providing a spending analysis display dynamically adapted to defined categories of day and/or date to the first Uber financial transaction category, in one embodiment, the user may change this mapping to another Uber financial transaction category, or to the uncategorized/undetermined financial transaction category. One reason a user might wish to change the mapping of a financial transaction category to the uncategorized/undetermined financial transaction category would be to force the user to visualize and interact with a specific category of financial transactions, as discussed below.

Continuing with the specific illustrative example set forth above, in one embodiment, discretionary spending is defined as the first Uber financial transaction category.

In one embodiment, once the first Uber financial transaction category is defined, first Uber financial transaction category data is generated representing the defined first Uber financial transaction category.

In one embodiment, financial transaction data representing one or more financial transactions associated with a user conducted during the comparison timeframe is obtained.

In one embodiment, the financial transaction data is obtained from one or more financial management systems, such as any of the financial management systems discussed herein, and/or as known in the art at the time of filing, and/or as developed after the time of filing, and/or by any means as discussed herein, and/or as known in the art at the time of filing, and/or as becomes known after the time of filing.

In one embodiment, the financial transaction data is financial transaction data from a defined comparison timeframe including any of the defined comparison timeframes discussed above.

Continuing with the specific illustrative example set forth above, in one embodiment, financial transaction data representing one or more financial transactions associated with a user conducted during the previous 30 days is obtained, in one example, from a financial transaction management system.

In one embodiment, analysis is performed on the financial transaction data to identify one or more financial transactions associated with a user conducted during the one or more first category time periods that occurred in the defined comparison timeframe and that are mapped to the first Uber financial transaction category.

In one embodiment, once the financial transaction data is obtained, as many of the financial transactions represented in the financial transaction data are categorized in the financial transaction categories as is possible.

In one embodiment, as many of the categorized financial transactions, and as much categorized financial transaction data, as possible is mapped to the first Uber financial transaction category using the financial transaction category to Uber financial transaction category mapping discussed above.

In one embodiment, as a result of the categorization and mapping of the financial transactions represented in the financial transaction data, each of the financial transactions represented in the financial transaction data is assigned to one of three general categories; the first Uber financial transaction category, any Uber financial transaction category other than the first Uber financial transaction category, or the uncategorized/undetermined financial transaction category.

In one embodiment, all of the financial transactions represented in the financial transaction data mapped to the first Uber financial transaction category are also analyzed to identify financial transactions represented in the financial transaction data mapped to the first Uber financial transaction category and conducted during the one or more first category time periods.

Continuing with the specific illustrative example set forth above, in one embodiment, the financial transaction data representing one or more financial transactions associated with a user conducted during the previous 30 days is analyzed to identify discretionary spending related financial transactions associated with a user conducted during the previous 30 days on work days/weekdays.

In one embodiment, financial transactions represented in the financial transaction data mapped to the first Uber financial transaction category and conducted during the one or more first category time periods are accumulated and a first Uber financial transaction category first category time period cumulative amount representing the cumulative total of the amounts of the financial transactions represented in the financial transaction data mapped to the first Uber financial transaction category and conducted during the one or more first category time periods is calculated.

Consequently, as a specific illustrative example, in one embodiment, all of the financial transactions represented in the financial transaction data mapped to the wants/discretionary Uber financial transaction category that were conducted on work days/weekdays are accumulated and a cumulative total of the amounts of the financial transactions mapped to the wants/discretionary financial transaction category conducted on work days/weekdays is calculated to reveal the user's total spending for the comparison timeframe in the wants/discretionary Uber financial transaction category conducted on work days/weekdays.

Continuing with the specific illustrative example set forth above, a first Uber financial transaction category first category time period cumulative amount is calculated by adding total of the amounts of the identified discretionary spending related financial transactions associated with a user conducted during the previous 30 days on work days/weekdays. In this specific illustrative example, we stipulate that the first Uber financial transaction category first category time period cumulative amount is calculated as $940.00.

In one embodiment, all of the financial transactions represented in the financial transaction data mapped to the first Uber financial transaction category are also analyzed to identify financial transactions represented in the financial transaction data mapped to the first Uber financial transaction category and conducted during the one or more second category time periods.

Continuing with the specific illustrative example set forth above, in one embodiment, the financial transaction data representing one or more financial transactions associated with a user conducted during the previous 30 days is analyzed to identify discretionary spending related financial transactions associated with a user conducted during the previous 30 days on non-work days/weekend days.

In one embodiment, once the first Uber financial transaction category first category time period cumulative amount is calculated, first Uber financial transaction category second category time period cumulative amount data representing the first Uber financial transaction category second category time period cumulative amount is generated.

In one embodiment, financial transactions represented in the financial transaction data mapped to the first Uber financial transaction category and conducted during the one or more second category time periods are accumulated and a second Uber financial transaction category second category time period cumulative amount representing cumulative total of the amounts of the financial transactions represented in the financial transaction data mapped to the first Uber financial transaction category and conducted during the one or more second category time periods is calculated.

Consequently, as a specific illustrative example, in one embodiment, all of the financial transactions represented in the financial transaction data mapped to the wants/discretionary Uber financial transaction category that were conducted on non-work days/weekend days are accumulated and a cumulative total of the amounts of the financial transactions mapped to the wants/discretionary financial transaction category conducted on non-work days/weekend days is calculated to reveal the user's total spending for the comparison timeframe in the wants/discretionary Uber financial transaction category conducted on non-work days/weekend days.

Continuing with the specific illustrative example set forth above, a first Uber financial transaction category second category time period cumulative amount is calculated by adding total of the amounts of the identified discretionary spending related financial transactions associated with a user conducted during the previous 30 days on non-work days/weekend days. In this specific illustrative example, we stipulate that the first Uber financial transaction category second category time period cumulative amount is calculated as $910.00.

In one embodiment, all of the financial transaction data representing uncategorized/undetermined financial transactions in the defined comparison timeframe is also accumulated.

In one embodiment, a history of the user's spending is obtained and stored. In this embodiment, a user's financial transactions during the defined comparison timeframe is compared with the user's similar historical financial transactions in previous time periods. In one embodiment, if the user's financial transactions during the defined comparison timeframe are for amounts that are significantly different from the user's similar historical financial transactions, then the current financial transactions are categorized as undetermined/uncategorized even if the financial transactions would normally be mapped to either the first, or another, Uber financial transaction category.

In this way, in one embodiment, even though a specific financial transaction category is typically mapped to a specific Uber financial transaction category, if the amount of the specific financial transactions changes, e.g., increases, the normal mapping of the financial transaction is no longer considered valid and the user is asked to examine the financial transaction and categorize it manually. So, as a specific illustrative example, if a user has a monthly financial transaction categorized as utilities for an amount that averages between $100 and $200 and then, in the current relevant time period, the monthly financial transaction categorized as utilities jumps to $500, that financial transaction will be sent to the uncategorized/undetermined financial transaction category, as opposed to the normal second, or needs, Uber financial transaction category. Consequently, if the user has increased the user's utility bill by adding holiday lights to the house, the user is not only made aware of this fact, but the user is forced to categorize the new amount, at least in part, as a wants-based transaction as opposed to the normal needs-based transaction.

In one embodiment, an average first Uber financial transaction category first category time period amount is calculated by dividing the first Uber financial transaction category first category time period cumulative amount by the comparison timeframe first category time period number.

Continuing with the specific illustrative example set forth above, an average first Uber financial transaction category first category time period amount is calculated by dividing the first Uber financial transaction category first category time period cumulative amount of $940.00 by the comparison timeframe first category time period number of 20 to yield an average first Uber financial transaction category first category time period amount of $47.00.

In one embodiment, an average first Uber financial transaction category second category time period amount is calculated by dividing the first Uber financial transaction category second category time period cumulative amount by the comparison timeframe second category time period number.

Continuing with the specific illustrative example set forth above, an average first Uber financial transaction category second category time period amount is calculated by dividing the second Uber financial transaction category first category time period cumulative amount of $910.00 by the comparison timeframe second category time period number of 10 to yield an average first Uber financial transaction category second category time period amount of $91.00.

In one embodiment, a spending analysis display is generated including a first Uber financial transaction category analysis display region.

In one embodiment a determination is made as to whether a current time is in the first category time period or the second category time period for the user. In one embodiment, the determination as to whether a current time is in the first category time period or the second category time period is made based on current time data received from a user computing system associated with the user, and/or GPS data provided by a user computing system associated with the user.

In one embodiment, the determination as to whether a current time is in the first category time period or the second category time period is made based on data provided by the user.

In various embodiments, the determination as to whether a current time is in the first category time period or the second category time period is made based on data from any source of current time data discussed herein, and/or as known in the art at the time of filing, and/or as developed after the time of filing.

In one embodiment, if the current time is determined to be in the first category time period for the user, the first Uber financial transaction category analysis display region includes a first Uber financial transaction category analysis number calculated based on the calculated average first Uber financial transaction category first category time period amount.

In various embodiments, the first Uber financial transaction category analysis number calculated and displayed is simply the average first Uber financial transaction category first category time period amount. In other embodiments, the first Uber financial transaction category analysis number calculated and displayed is a further processed number determined based on the average first Uber financial transaction category first category time period amount. For instance, in one embodiment, the first Uber financial transaction category analysis number is the average first Uber financial transaction category first category time period amount minus recent transaction amounts categorized as being in the first Uber financial transaction category to reveal an amount left for spending in the first Uber financial transaction category.

Figure 4:
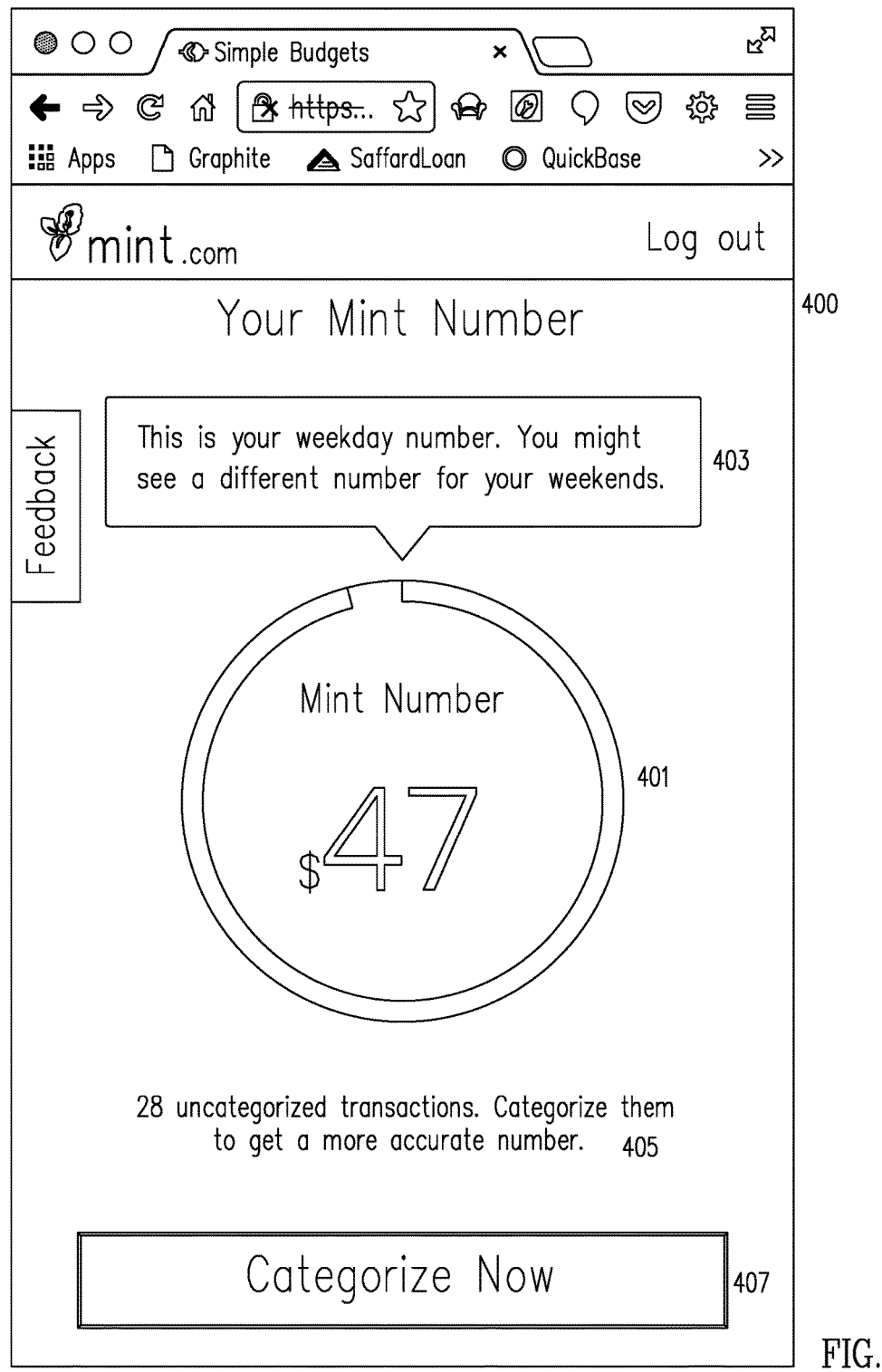
FIG. 4 shows an illustrative example of a spending analysis display in accordance with one embodiment.

Continuing with the specific illustrative example set forth above, if the current time is determined to be a work day/weekday for the user, the calculated average first Uber financial transaction category first category time period amount of $47.00 is displayed in the first Uber financial transaction category analysis display region. A specific illustrative example of this first Uber financial transaction category analysis display region is shown in FIG. 4 and is discussed below.

Figure 5:
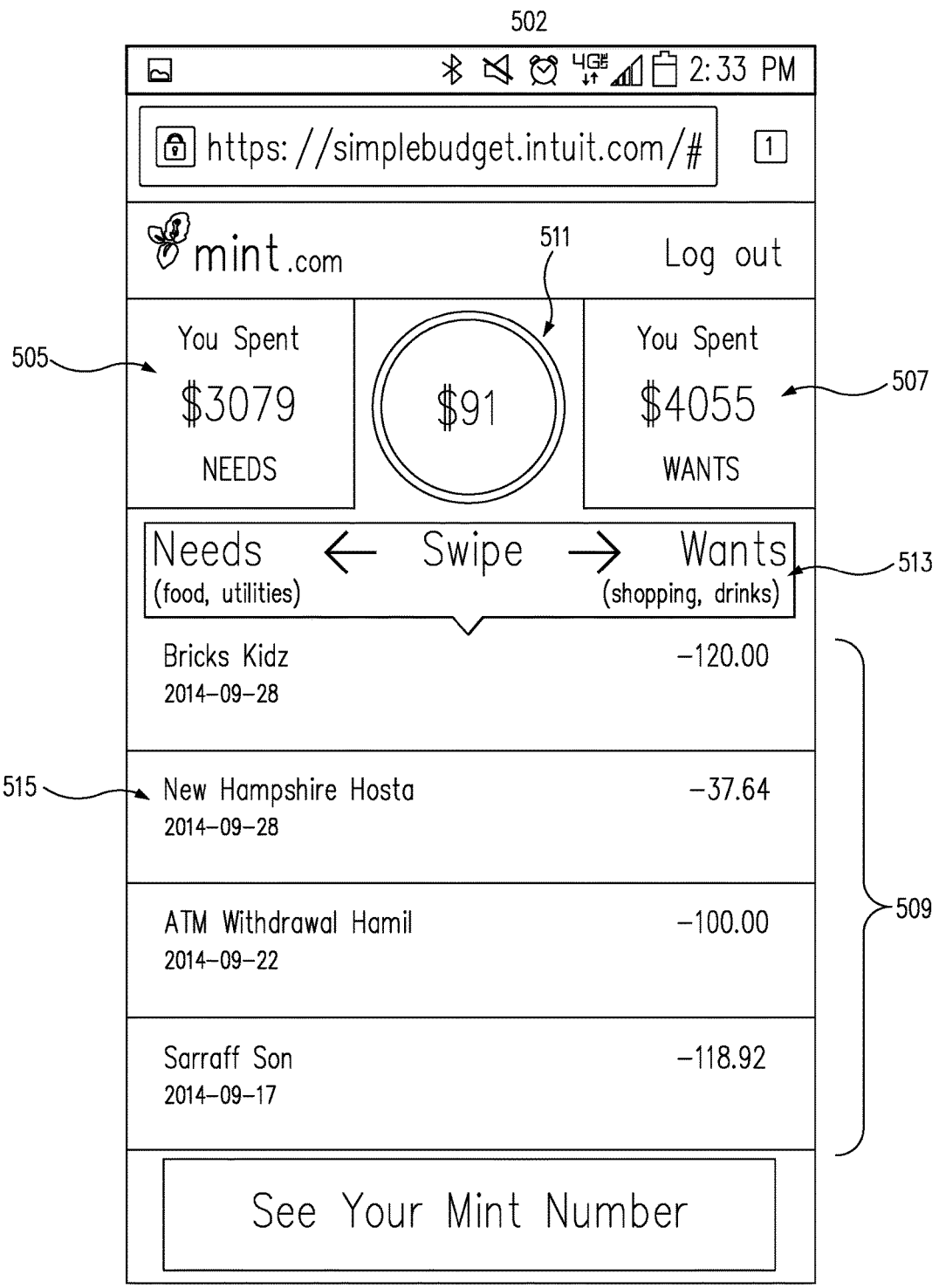
FIG. 5 shows an illustrative example of an intuitive and interactive spending analysis display in accordance with one embodiment.

In one embodiment, if the current time is determined to be in the second category time period for the user, the first Uber financial transaction category analysis display region includes a first Uber financial transaction category analysis number calculated based on the calculated average first Uber financial transaction category second category time period amount. A specific illustrative example of this first Uber financial transaction category analysis display region is shown in FIG. 5 and is discussed below.

In various embodiments, the first Uber financial transaction category analysis number calculated and displayed is simply the average first Uber financial transaction category second category time period amount. In other embodiments, the first Uber financial transaction category analysis number calculated and displayed is a further processed number determined based on the average first Uber financial transaction category second category time period amount. For instance, in one embodiment, the first Uber financial transaction category analysis number is the average first Uber financial transaction category second category time period amount minus recent transaction amounts categorized as being in the first Uber financial transaction category to reveal an amount left for spending in the first Uber financial transaction category.

Continuing with the specific illustrative example set forth above, if the current time is determined to be a non-work day/weekend day for the user, the calculated average first Uber financial transaction category second category time period amount of $91.00 is displayed.

In one embodiment, the spending analysis display is then made accessible to the user via a display screen of a user computing system.

As noted above, FIG. 4 a specific illustrative example of a spending analysis display 400 including first Uber financial transaction category analysis display region 401. As seen in FIG. 4, spending analysis display 400 also includes notification 403 indicating to the user that first Uber financial transaction category analysis display region 401 shows the average first Uber financial transaction category first category time period amount, e.g., the average first Uber financial transaction category weekday amount, that may be different from the average first Uber financial transaction category second category time period amount, e.g., the average first Uber financial transaction category weekend day amount.

As also shown in FIG. 4, spending analysis display 400 includes notification 405 indicating that there are 28 financial transactions that have not been categorized as being in the first Uber financial transaction category, or another Uber financial transaction category, and categorize now field 407 that can be activated to link to the 28 financial transactions that have not been categorized as being in the first Uber financial transaction category, for categorization purposes.

In one embodiment, the spending analysis display is an intuitive and interactive spending analysis display that includes at least four display regions; a first spending analysis display region for displaying the cumulative of total of the amounts of the financial transactions mapped to the first Uber financial transaction category, a second spending analysis display region for displaying the cumulative total of the amounts of the financial transactions mapped to a second Uber financial transaction category, a third spending analysis display region for displaying the individual uncategorized/undetermined financial transactions not mapped to either the first or second Uber financial transaction categories; and a fourth analysis display region that is a first Uber financial transaction category analysis display region.

In various embodiments, the first and second regions of the intuitive and interactive spending analysis display are visually distinguishable from each other and represented as physically removed from one another. For instance, as a specific illustrative example, in one embodiment, the first display region of the intuitive and interactive spending analysis display is of a first color, and/or includes the cumulative total of the amounts of the financial transactions mapped to the first Uber financial transaction category, and is displayed in a first display region on a first side of the spending analysis display, while the second display region of the spending analysis display is of a second color, and/or includes the cumulative total of the amounts of the financial transactions mapped to the second Uber financial transaction category, and is displayed in a second display region on a second side of the spending analysis display.

As another specific illustrative example, in one embodiment, the first display region of the spending analysis display includes a first icon graphic of a first color, and/or includes the cumulative total of the amounts of the financial transactions mapped to the first Uber financial transaction category, and is displayed in a first display region on a first side of the spending analysis display, while the second display region of the spending analysis display includes a second icon graphic of a second color, and/or includes the cumulative total of the amounts of the financial transactions mapped to the second Uber financial transaction category, and is displayed in a second display region on a second side of the spending analysis display.

As another specific illustrative example, in one embodiment, the first display region of the spending analysis display includes a first animated graphic of a first color, and/or includes the cumulative total of the amounts of the financial transactions mapped to the first Uber financial transaction category, and is displayed in a first display region on a first side of the spending analysis display, while the second display region of the spending analysis display includes a second animated graphic of a second color, and/or includes the cumulative total of the amounts of the financial transactions mapped to the second Uber financial transaction category, and is displayed in a second display region on a second side of the spending analysis display.

As another specific illustrative example, in one embodiment, the first display region of the spending analysis display includes a first shaped graphic of a first color, and/or includes the cumulative total of the amounts of the financial transactions mapped to the first Uber financial transaction category, and is displayed in a first display region on a first side of the spending analysis display, while the second display region of the spending analysis display includes a second shaped graphic of a second color, and/or includes the cumulative total of the amounts of the financial transactions mapped to the second Uber financial transaction category, and is displayed in a second display region on a second side of the spending analysis display.

As another specific illustrative example, in one embodiment, the first display region of the spending analysis display includes a first symbol graphic of a first color, and/or includes the cumulative total of the amounts of the financial transactions mapped to the first Uber financial transaction category, and is displayed in a first display region on a first side of the spending analysis display, while the second display region of the spending analysis display includes a second symbol graphic of a second color, and/or includes the cumulative total of the amounts of the financial transactions mapped to the second Uber financial transaction category, and is displayed in a second display region on a second side of the spending analysis display.

As another specific illustrative example, in one embodiment, the first display region of the spending analysis display includes a first alpha-numeric graphic of a first color, and/or includes the cumulative total of the amounts of the financial transactions mapped to the first Uber financial transaction category, and is displayed in a first display region on a first side of the spending analysis display, while the second display region of the spending analysis display includes a second alpha-numeric graphic of a second color, and/or includes the cumulative total of the amounts of the financial transactions mapped to the second Uber financial transaction category, and is displayed in a second display region on a second side of the spending analysis display.

As another specific illustrative example, in one embodiment, the first display region of the spending analysis display includes a first avatar graphic of a first color, and/or includes the cumulative total of the amounts of the financial transactions mapped to the first Uber financial transaction category, and is displayed in a first display region on a first side of the spending analysis display, while the second display region of the spending analysis display includes a second avatar graphic of a second color, and/or includes the cumulative total of the amounts of the financial transactions mapped to the second Uber financial transaction category, and is displayed in a second display region on a second side of the spending analysis display.

In various other embodiments, the first display region of the intuitive and interactive spending analysis display includes any graphic of any color, and/or includes the cumulative total of the amounts of the financial transactions mapped to the first Uber financial transaction category, and is displayed in a first display region in any region of the intuitive and interactive spending analysis display, while the second display region of the intuitive and interactive spending analysis display includes any graphic of any color, and/or includes the cumulative total of the amounts of the financial transactions mapped to the second Uber financial transaction category, and is displayed in a second display region in any different region of the intuitive and interactive spending analysis display.

FIG. 5 shows an illustrative example of an intuitive and interactive spending analysis display 502 in accordance with one embodiment. As seen in FIG. 5, intuitive and interactive spending analysis display 502 includes first display region 507 and second display region 505. In the specific illustrative example of FIG. 5, first display region 507 and second display region 505 are visually distinguishable from each other and represented as physically removed from one another.

In the specific illustrative example of FIG. 5, first display region 507 of intuitive and interactive spending analysis display 502 is labeled "wants" and, in one embodiment, is of a first color. In the specific illustrative example of FIG. 5, first display region 507 of intuitive and interactive spending analysis display 502 includes an initial cumulative total of the amounts of the financial transactions mapped to the first, or wants, Uber financial transaction category, i.e., $4055, for the defined comparison timeframe, and is displayed in the upper right side of intuitive and interactive spending analysis display 502.

Similarly, in the specific illustrative example of FIG. 5, second display region 505 of intuitive and interactive spending analysis display 502 is labeled "needs" and, in one embodiment, is of a second color. In the specific illustrative example of FIG. 5, second display region 505 of intuitive and interactive spending analysis display 502 includes an initial cumulative total of the amounts of the financial transactions mapped to the second, or needs, Uber financial transaction category, i.e., $3079, for the defined comparison timeframe, and is displayed in the upper left side of intuitive and interactive spending analysis display 502.

In the specific illustrative example of FIG. 5, third spending analysis display region 509 of interactive spending analysis display 502 includes an uncategorized/undetermined financial transaction listing of the individual uncategorized/undetermined financial transactions not mapped to either the needs or wants Uber financial transaction categories. Also seen in FIG. 5 is exemplary individual uncategorized/undetermined financial transaction 515 representing a payment of $37.64 to "New Hampshire Hosta"

In the specific illustrative example of FIG. 5, third spending analysis display region 509 of interactive spending analysis display 502 is positioned approximately halfway between the wants and needs spending analysis display regions 507 and 505, and is positioned in the middle of interactive spending analysis display 502.

In the specific illustrative example of FIG. 5, a fourth analysis display region 511 is shown that is a first Uber financial transaction category analysis display region. In this specific illustrative example, fourth analysis display region 511 includes a spending analysis number of $91.00 that is the average first Uber financial transaction category second category time period amount, e.g., the average first Uber financial transaction category weekend day amount.

In the specific illustrative example of FIG. 5, swipe input display 513 is included. In the specific illustrative example of FIG. 5 swipe input display 513 allows a user to select one of the uncategorized/undermined financial transactions listed in third display region 509 of interactive spending analysis display 502 and then make a sweeping motion in swipe region 513 to the right to automatically categorize the selected uncategorized/undermined financial transaction listed in third display region 509 as a member of the wants Uber financial transaction category. In one embodiment, the cumulative amount of the wants Uber financial transaction category is then transformed to include an amount of the selected uncategorized/undermined financial transaction.

Likewise, in the specific illustrative example of FIG. 5 swipe input display 513 allows a user to select one of the uncategorized/undermined financial transactions listed in third display region 509 of interactive spending analysis display 502 and then make a sweeping motion in swipe region 513 to the left to automatically categorize the selected uncategorized/undermined financial transaction listed in third display region 509 as a member of the needs Uber financial transaction category. In one embodiment, the cumulative amount of the needs Uber financial transaction category is then transformed to include an amount of the selected uncategorized/undermined financial transaction.

FIG. 1 is a block diagram of a hardware and production environment 100 for, in one embodiment, implementing a method and system for providing a spending analysis display dynamically adapted to defined categories of day and/or date. As seen in FIG. 1, provider computing system 103 is shown as implemented in provider computing environment 101.

As seen in FIG. 1, in one embodiment, provider computing system 103 includes first category time period data 105 representing the defined one or more first category time periods and second category time period data 107 representing the defined one or more second category time periods, distinct from the first category time periods. As also seen in FIG. 1, provider computing system 103 includes comparison timeframe data 109 representing the defined comparison timeframe.

As seen in FIG. 1, in one embodiment, provider computing system 103 includes comparison timeframe first and second category time period number determination module 111 for calculating a comparison timeframe first category time period number by determining the number of first category time periods that occurred in the defined comparison timeframe and a comparison timeframe second category time period number by determining the number of second category time periods that occurred in the defined comparison timeframe.

As seen in FIG. 1, in one embodiment, provider computing system 103 includes first Uber financial transaction category data 113 representing the defined first Uber financial transaction category and financial transaction data 115.

As seen in FIG. 1, in one embodiment, provider computing system 103 includes first analysis module 117 for analyzing financial transaction data 115 to identify one or more financial transactions associated with a user conducted during the one or more first category time periods that occurred in the defined comparison timeframe and that are mapped to the first Uber financial transaction category.

As seen in FIG. 1, in one embodiment, provider computing system 103 includes second analysis module 119 for analyzing financial transaction data 115 to identify one or more financial transactions associated with a user conducted during the one or more second category time periods that occurred in the defined comparison timeframe and that are mapped to the first Uber financial transaction category.

As seen in FIG. 1, in one embodiment, provider computing system 103 includes a first Uber financial transaction category first category time period cumulative amount calculation module 121 for calculating a first Uber financial transaction category first category time period cumulative amount by determining the total cumulative amount of the one or more financial transactions of financial transaction data 115 associated with a user mapped to the first Uber financial transaction category that were conducted during the one or more first category time periods of the comparison timeframe.

As seen in FIG. 1, in one embodiment, provider computing system 103 includes an average first Uber financial transaction category first category time period amount calculation module 122 for calculating an average first Uber financial transaction category first category time period amount by dividing the first Uber financial transaction category first category time period cumulative amount by the comparison timeframe first category time period number.

As seen in FIG. 1, in one embodiment, provider computing system 103 includes first Uber financial transaction category second category time period cumulative amount calculation module 123 for calculating a first Uber financial transaction category second category time period cumulative amount by determining the total cumulative amount of the one or more financial transactions of financial transaction data 115 associated with a user mapped to the first Uber financial transaction category that were conducted during the one or more second category time periods of the comparison timeframe;

As seen in FIG. 1, in one embodiment, provider computing system 103 includes an average first Uber financial transaction category second category time period amount calculation module 124 for calculating an average first Uber financial transaction category second category time period amount by dividing the first Uber financial transaction category second category time period cumulative amount by the comparison timeframe second category time period number.

As seen in FIG. 1, in one embodiment, provider computing system 103 includes a time period determination module 125 for determining whether a current time is in the first category time period or the second category time period for the user;

As seen in FIG. 1, in one embodiment, provider computing system 103 includes a spending analysis display generation module 127 for generating spending analysis display data 129. As seen in FIG. 1, in one embodiment, provider computing system 103 includes spending analysis display transmission module 133 used to transmit spending analysis display data 129 to user computing system 143 in user computing environment 140.

As seen in FIG. 1, in one embodiment, spending analysis display data 129 is used to generate spending analysis display 147 on display screen 145 of user computing system 143.

In one embodiment, spending analysis display 147 includes first Uber financial transaction category analysis display region 151 that includes a first Uber financial transaction category analysis number 153 calculated based on the calculated average first Uber financial transaction category first category time period amount if the current time is determined to be in the first category time period or a first Uber financial transaction category analysis number 153 calculated based on the calculated average first Uber financial transaction category second category time period amount if the current time is determined to be in the second category time period.

The various embodiments of the disclosure can be implemented to improve the technical fields of user experience, automated financial management, data collection, and data processing. Therefore, the various described embodiments of the disclosure and their associated benefits amount to significantly more than an abstract idea.

Using the system for providing a spending analysis display dynamically adapted to defined categories of day and/or date discussed herein, a solution to the long standing problem of failure to take into account periodically repeating variations in user spending, and in particular, variations in user spending that naturally occur over the course of a day, a week, a month, a quarter, a year, or any defined period of time based on the hours and days of the week the user works, seasonal employment and spending, and/or other particulars of an individual user's life and career, that can cause periodically repeating variations in user spending is provided.

The system for providing a spending analysis display dynamically adapted to defined categories of day and/or date solves the problem by providing users an intuitive and interactive spending analysis display that is dynamically adapted to the display day and/or date and that allows users to intuitively and easily see their discretionary and non-discretionary spending, to categorize undetermined financial transactions in a relevant and engaging way, and provide simple, user friendly, intuitive, and interactive spending analysis/tracking that is dynamically adjusted/adapted to reflect periodically repeating variations in user spending.

Therefore, the system for providing a spending analysis display dynamically adapted to defined categories of day and/or date discussed herein significantly improves the technical fields of data entry/selection and user experience. Therefore, implementations of embodiments of the present disclosure represent a significant improvement to the field of user experience and, in particular, efficient use of human and non-human resources.

In addition, by eliminating the necessity of performing unnecessary analysis and displaying detailed, and often undesired, reports and data, there is less data entry, less processing of data, and fewer errors in entered data. Consequently, using the system for providing a spending analysis display dynamically adapted to defined categories of day and/or date discussed herein, fewer processor cycles are utilized, memory utilization is reduced, and less communications bandwidth is utilized to relay data to and from backend systems. As a result, computing systems, and particularly mobile computing systems, are transformed into faster, more efficient, and more effective computing systems by implementing the system for providing a spending analysis display dynamically adapted to defined categories of day and/or date discussed herein.

The various embodiments of the disclosure and their associated benefits also improve the technical field of financial management by providing users with a relevant and simple spending and financial display while requiring minimal user input. In addition, embodiments of the present disclosure allow the financial management system to offer a more relevant analysis of a user's financial situation. Further, the increased relevancy of the data provided using embodiments of the present disclosure increase the chances that a user will continue using the financial management system.

As a result, using implementations of embodiments of the present disclosure, the fields of financial management, financial data processing, data entry, data display, data processing, and user experience are significantly improved.

Process

In accordance with one embodiment, a process for providing a spending analysis display dynamically adapted to defined categories of day and/or date includes defining one or more first category time periods and one or more second category time periods, distinct from the first category time periods. In one embodiment, a comparison timeframe is defined. In one embodiment, the comparison timeframe includes one or more first category time periods and/or one or more second category time periods.

In one embodiment, a comparison timeframe first category time period number is calculated. In one embodiment, the comparison timeframe first category time period number is calculated by determining the number of first category time periods that occurred in the defined comparison timeframe. In one embodiment, a comparison timeframe second category time period number is calculated. In one embodiment, the comparison timeframe second category time period number is calculated by determining the number of second category time periods that occurred in the defined comparison timeframe.

In one embodiment, a first Uber financial transaction category is defined. In one embodiment, financial transaction data representing one or more financial transactions associated with a user conducted during the comparison timeframe is obtained. In one embodiment, analysis is performed on the financial transaction data to identify one or more financial transactions associated with a user conducted during the one or more first category time periods that occurred in the defined comparison timeframe and that are mapped to the first Uber financial transaction category. Likewise, In one embodiment, analysis is performed on the financial transaction data to identify one or more financial transactions associated with the user conducted during the one or more second category time periods that occurred in the defined comparison timeframe and that are mapped to the first Uber financial transaction category.

In one embodiment, a first Uber financial transaction category first category time period cumulative amount is calculated by determining the total cumulative amount of the one or more financial transactions associated with a user mapped to the first Uber financial transaction category that were conducted during the one or more first category time periods of the comparison timeframe and a first Uber financial transaction category second category time period cumulative amount is calculated by determining the total cumulative amount of the one or more financial transactions associated with a user mapped to the first Uber financial transaction category that were conducted during the one or more second category time periods of the comparison timeframe.

In one embodiment, an average first Uber financial transaction category first category time period amount is calculated by dividing the first Uber financial transaction category first category time period cumulative amount by the comparison timeframe first category time period number and an average first Uber financial transaction category second category time period amount is calculated by dividing the first Uber financial transaction category second category time period cumulative amount by the comparison timeframe second category time period number.

In one embodiment a determination is made as to whether a current time is in the first category time period or the second category time period for the user. In one embodiment, a spending analysis display is then generated including a first Uber financial transaction category analysis display region.

In one embodiment, if the current time is determined to be in the first category time period for the user, the first Uber financial transaction category analysis display region includes a first Uber financial transaction category analysis number calculated based on the calculated average first Uber financial transaction category first category time period amount.

In one embodiment, if the current time is determined to be in the second category time period for the user, the first Uber financial transaction category analysis display region includes a first Uber financial transaction category analysis number calculated based on the calculated average first Uber financial transaction category second category time period amount.

In one embodiment, the spending analysis display is then made accessible to the user via a display screen of a user computing system.

Figure 2:
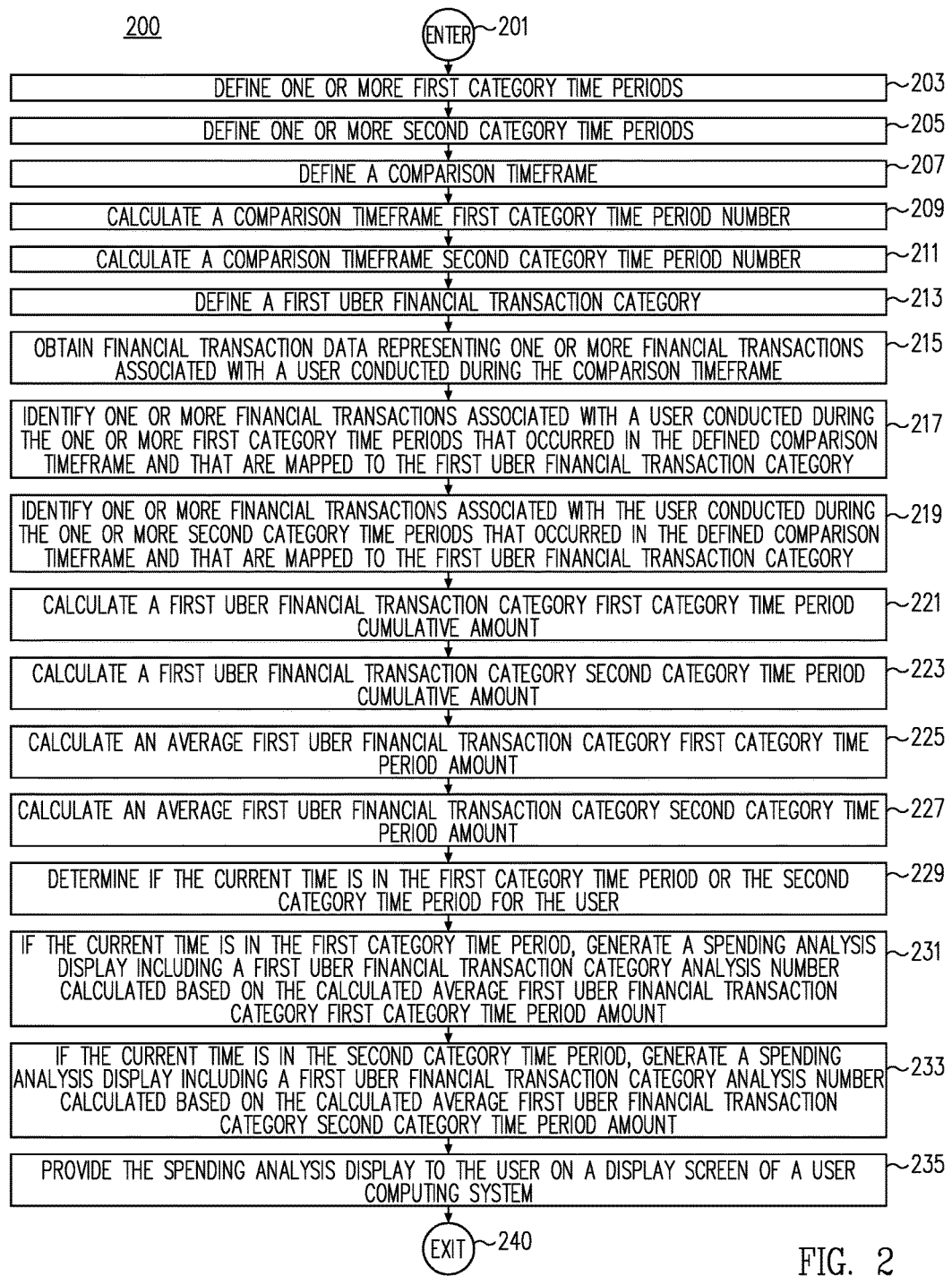
FIG. 2 is a flow chart representing one example of a process for providing a spending analysis display dynamically adapted to defined categories of day and/or date in accordance with one embodiment.

FIG. 2 is a flow chart representing one example of a process 200 for providing a spending analysis display dynamically adapted to defined categories of day and/or date in accordance with one embodiment.

As seen in FIG. 2, process 200 for providing a spending analysis display dynamically adapted to defined categories of day and/or date begins at ENTER OPERATION 201 and process flow proceeds to DEFINE ONE OR MORE FIRST CATEGORY TIME PERIODS OPERATION 203.

In one embodiment, at DEFINE ONE OR MORE FIRST CATEGORY TIME PERIODS OPERATION 203 one or more first category time periods are defined.

In various embodiments, the one or more first category time periods of DEFINE ONE OR MORE FIRST CATEGORY TIME PERIODS OPERATION 203 represent time periods of a first type for the user, such as, but not limited to, time periods when the user is working, awake, traveling, or any other time periods distinguished from other time periods, such as the one or more second category time periods of DEFINE ONE OR MORE SECOND CATEGORY TIME PERIODS OPERATION 205 discussed below, by a particular event or activity the given user engages in during the one or more first category time periods. In various embodiments, the one or more first category time periods are defined at DEFINE ONE OR MORE FIRST CATEGORY TIME PERIODS OPERATION 203 by the particular user; and/or process 200 for providing a spending analysis display dynamically adapted to defined categories of day and/or date; and/or the provider of process 200 for providing a spending analysis display dynamically adapted to defined categories of day and/or date; and/or any other party.

In various embodiments, the one or more first category time periods of DEFINE ONE OR MORE FIRST CATEGORY TIME PERIODS OPERATION 203 can be, but are not limited to, specified hours of the day; specified hours of a specified day; a specified day; specified days of the week; specified days of a specified week; specified days of one or more specified weeks; specified days of a month; specified days of a specified month; specified weeks of a month; specified days of one or more specified months; specified weeks of one or more specified months; a specified month; one or more specified months; a specified month of a specified year; one or more specified months of a specified year; a specified month of one or more specified years; one or more specified months of one or more specified years; a specified year; one or more specified years; and/or any other time period or timeframe discussed herein, and/or as known in the art at the time of filing, and/or as developed/determined after the time of filing.

Figure 3:
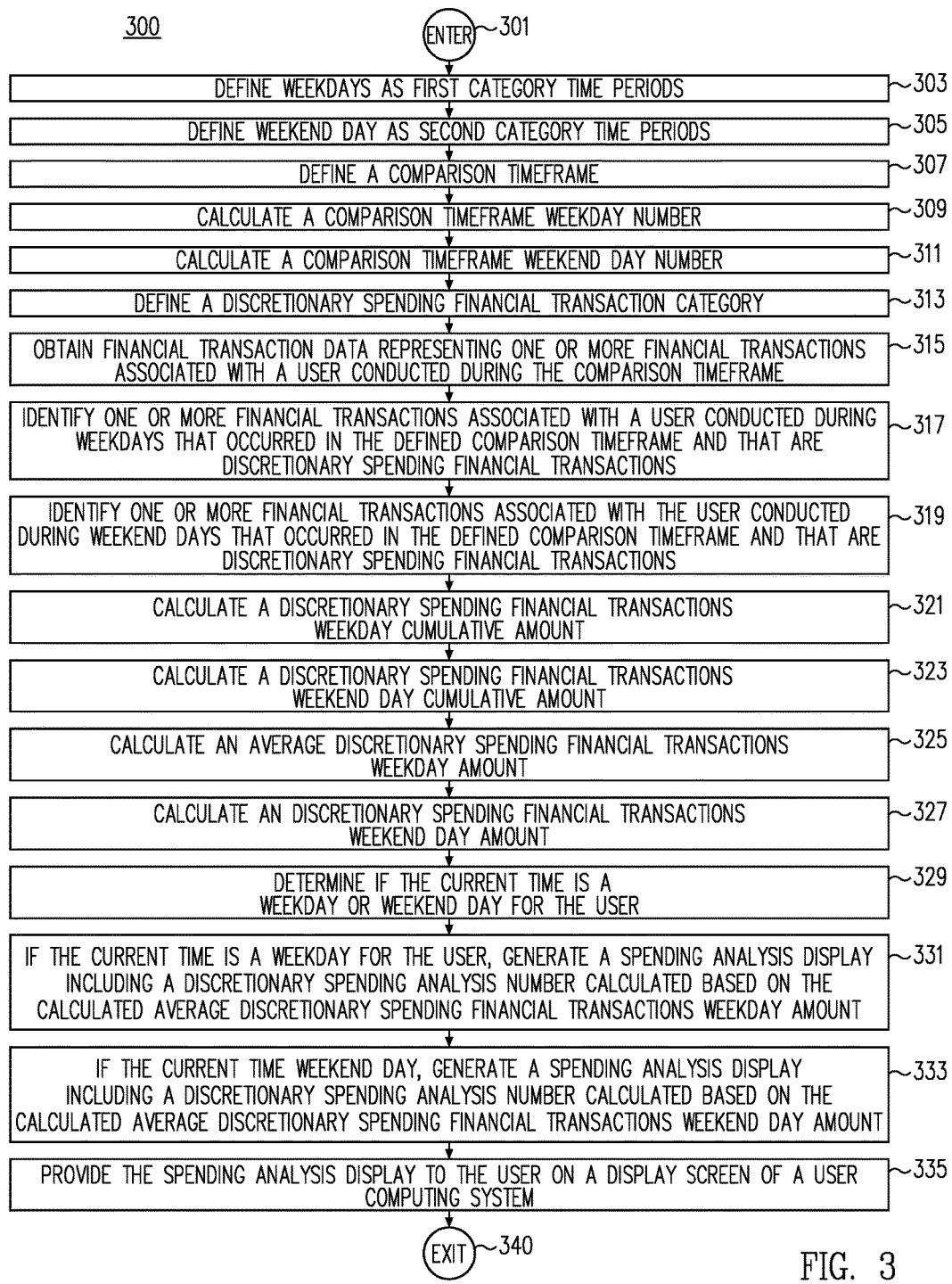
FIG. 3 is a flow chart representing one example of a process for providing a spending analysis display dynamically adapted to defined categories of day and/or date in accordance with one embodiment.

As one non-limiting specific illustrative example of one embodiment, work days, working hours, or weekdays, are defined as first category time periods at DEFINE ONE OR MORE FIRST CATEGORY TIME PERIODS OPERATION 203, for instance see DEFINE WEEKDAYS AS FIRST CATEGORY TIME PERIODS OPERATION 303 of FIG. 3.

Returning to FIG. 2, in one embodiment, once the one or more first category time periods are defined, first category time period data is generated at DEFINE ONE OR MORE FIRST CATEGORY TIME PERIODS OPERATION 203 representing the defined one or more first category time periods.

In one embodiment, once one or more first category time periods are defined at DEFINE ONE OR MORE FIRST CATEGORY TIME PERIODS OPERATION 203, process flow proceeds to DEFINE ONE OR MORE SECOND CATEGORY TIME PERIODS OPERATION 205.

In one embodiment, at DEFINE ONE OR MORE SECOND CATEGORY TIME PERIODS OPERATION 205 one or more second category time periods, distinct from the first category time periods, are defined.

In various embodiments, the one or more second category time periods of DEFINE ONE OR MORE SECOND CATEGORY TIME PERIODS OPERATION 205 represent time periods of a second type for the user, that are distinct from the one or more first category time periods of DEFINE ONE OR MORE FIRST CATEGORY TIME PERIODS OPERATION 203, such as, but not limited to, time periods when the user is not working, asleep, at home, or any other time periods distinguished from the one or more first category time periods by a particular event or activity the given user engages in during the one or more second category time periods. In various embodiments, the one or more second category time periods are defined at DEFINE ONE OR MORE SECOND CATEGORY TIME PERIODS OPERATION 205 by the particular user; and/or process 200 for providing a spending analysis display dynamically adapted to defined categories of day and/or date; and/or the provider of process 200 for providing a spending analysis display dynamically adapted to defined categories of day and/or date; and/or any other party.

In various embodiments, the one or more second category time periods of DEFINE ONE OR MORE SECOND CATEGORY TIME PERIODS OPERATION 205 can be, but are not limited to, specified hours of the day; specified hours of a specified day; a specified day; specified days of the week; specified days of a specified week; specified days of one or more specified weeks; specified days of a month; specified days of a specified month; specified weeks of a month; specified days of one or more specified months; specified weeks of one or more specified months; a specified month; one or more specified months; a specified month of a specified year; one or more specified months of a specified year; a specified month of one or more specified years; one or more specified months of one or more specified years; a specified year; one or more specified years; and/or any other time period or timeframe discussed herein, and/or as known in the art at the time of filing, and/or as developed/determined after the time of filing.

As one non-limiting specific illustrative example of one embodiment, non-work days, non-work hours, or weekend days, are defined as second category time periods. For instance see DEFINE WEEKEND DAYS AS SECOND CATEGORY TIME PERIODS OPERATION 305 of FIG. 3.

Returning to FIG. 2, in one embodiment, once the one or more second category time periods are defined, second category time period data is generated at DEFINE ONE OR MORE SECOND CATEGORY TIME PERIODS OPERATION 205 representing the defined one or more second category time periods.

In one embodiment, one or more second category time periods, distinct from the first category time periods, are defined at DEFINE ONE OR MORE SECOND CATEGORY TIME PERIODS OPERATION 205, process flow proceeds to DEFINE A COMPARISON TIMEFRAME OPERATION 207.

In one embodiment, at DEFINE A COMPARISON TIMEFRAME OPERATION 207 a comparison timeframe is defined.

In one embodiment, the comparison timeframe of DEFINE A COMPARISON TIMEFRAME OPERATION 207 includes one or more first category time periods of DEFINE ONE OR MORE FIRST CATEGORY TIME PERIODS OPERATION 203, and/or one or more second category time periods of DEFINE ONE OR MORE SECOND CATEGORY TIME PERIODS OPERATION 205.

In various embodiments, the comparison timeframe of DEFINE A COMPARISON TIMEFRAME OPERATION 207 is the timeframe that is to be used to calculate various intermediate values and quantities and then eventually determine spending analysis numbers presented to the user in one or more spending analysis displays. As discussed below, only financial transaction data representing financial transactions conducted during the defined comparison timeframe is used to calculate various intermediate values and quantities and then eventually determine spending analysis numbers presented to the user in one or more spending analysis displays.

In various embodiments, the comparison timeframe of DEFINE A COMPARISON TIMEFRAME OPERATION 207 is defined by the particular user; and/or process 200 for providing a spending analysis display dynamically adapted to defined categories of day and/or date; and/or the provider of process 200 for providing a spending analysis display dynamically adapted to defined categories of day and/or date; and/or any other party.

In various embodiments, the comparison timeframe of DEFINE A COMPARISON TIMEFRAME OPERATION 207 can be, but is not limited to, specified hours of the day; specified hours of a specified day; a specified day; specified days of the week; specified days of a specified week; specified days of one or more specified weeks; specified days of a month; specified days of a specified month; specified weeks of a month; specified days of one or more specified months; specified weeks of one or more specified months; a specified month; one or more specified months; a specified month of a specified year; one or more specified months of a specified year; a specified month of one or more specified years; one or more specified months of one or more specified years; a specified year; one or more specified years; and/or any other time period or timeframe discussed herein, and/or as known in the art at the time of filing, and/or as developed/determined after the time of filing.

In one embodiment, the comparison timeframe is selected at DEFINE A COMPARISON TIMEFRAME OPERATION 207 so that the comparison timeframe is a shifting timeframe window such that the comparison timeframe is adapted each day, or new first or second category time period, to reflect the new and updated comparison timeframe. In this way, the comparison timeframe of DEFINE A COMPARISON TIMEFRAME OPERATION 207 is continuously evolving/shifting to represent the latest data and to determine spending analysis numbers presented to the user in one or more spending analysis displays on a dynamically evolving/shifting basis.

Continuing with the specific illustrative example set forth above, the previous 30 days is defined as the comparison timeframe. In one embodiment, the previous 30 days is selected so that the comparison timeframe is de facto a shifting timeframe window so that each day the previous 30 days is redefined and the spending analysis numbers presented to the user in one or more spending analysis displays are calculated on a dynamically evolving/shifting basis. For instance, if the comparison timeframe is defined as the previous 30 days starting on the $10^{th}$ of May, then on the $10^{th}$ of May the comparison timeframe is April 10th thru May 10th. However, on May 11th, the comparison timeframe is shifted to April 11th thru May 11th.

In one embodiment, once the comparison timeframe is defined, comparison timeframe data is generated at DEFINE A COMPARISON TIMEFRAME OPERATION 207 representing the defined comparison timeframe.

In one embodiment, once a comparison timeframe is defined at DEFINE A COMPARISON TIMEFRAME OPERATION 207, process flow proceeds to CALCULATE A COMPARISON TIMEFRAME FIRST CATEGORY TIME PERIOD NUMBER OPERATION 209.

In one embodiment, at CALCULATE A COMPARISON TIMEFRAME FIRST CATEGORY TIME PERIOD NUMBER OPERATION 209 a comparison timeframe first category time period number is calculated.

In one embodiment, the comparison timeframe first category time period number of CALCULATE A COMPARISON TIMEFRAME FIRST CATEGORY TIME PERIOD NUMBER OPERATION 209 is calculated by determining the number of first category time periods of DEFINE ONE OR MORE FIRST CATEGORY TIME PERIODS OPERATION 203 that occurred in the defined comparison timeframe of DEFINE A COMPARISON TIMEFRAME OPERATION 207.

Continuing with the specific illustrative example set forth above, in one embodiment, the comparison timeframe first category time period number is calculated by determining the number of work days, or weekdays, in the previous 30 days. For this specific example, assume there were 20 work days/weekdays in the past 30 days.

In one embodiment, once a comparison timeframe first category time period number is calculated at CALCULATE A COMPARISON TIMEFRAME FIRST CATEGORY TIME PERIOD NUMBER OPERATION 209, process flow proceeds to CALCULATE A COMPARISON TIMEFRAME SECOND CATEGORY TIME PERIOD NUMBER OPERATION 211.

In one embodiment, at CALCULATE A COMPARISON TIMEFRAME SECOND CATEGORY TIME PERIOD NUMBER OPERATION 211 a comparison timeframe second category time period number is calculated.

In one embodiment, the comparison timeframe second category time period number is calculated at CALCULATE A COMPARISON TIMEFRAME SECOND CATEGORY TIME PERIOD NUMBER OPERATION 211 by determining the number of second category time periods of DEFINE ONE OR MORE SECOND CATEGORY TIME PERIODS OPERATION 205 that occurred in the defined comparison timeframe of DEFINE A COMPARISON TIMEFRAME OPERATION 207.

Continuing with the specific illustrative example set forth above, in one embodiment, the comparison timeframe second category time period number is calculated by determining the number of non-work days, or weekend days, in the previous 30 days. For this specific example, assume there were 10 non-work/weekend days in the past 30 days.

In one embodiment, once the comparison timeframe second category time period number is calculated, comparison timeframe second category time period number data is generated at CALCULATE A COMPARISON TIMEFRAME SECOND CATEGORY TIME PERIOD NUMBER OPERATION 211 representing the calculated comparison timeframe second category time period number.

In one embodiment, once a comparison timeframe second category time period number is calculated at CALCULATE A COMPARISON TIMEFRAME SECOND CATEGORY TIME PERIOD NUMBER OPERATION 211, process flow proceeds to DEFINE A FIRST UBER FINANCIAL TRANSACTION CATEGORY OPERATION 213.

In one embodiment, at DEFINE A FIRST UBER FINANCIAL TRANSACTION CATEGORY OPERATION 213 a first Uber financial transaction category is defined.

In various embodiments, financial transaction categories are defined that represent manually or automatically applied financial transaction categories used to categorize and process various financial transactions associated with the user. In various embodiments, the financial transaction categories are defined by the provider of the method and system for providing a spending analysis display dynamically adapted to defined categories of day and/or date. In other embodiments, the financial transaction categories are defined by one or more financial management systems such as, but not limited to, any of the financial management systems as discussed herein, and/or as known in the art at the time of filing, and/or as developed after the time of filing.

Herein, a financial management system can be, but is not limited to, any data management system that gathers financial data, including financial transactional data, from one or more sources, such as financial accounts and financial institutions, and/or has the capability to analyze and categorize at least part of the financial data.

As discussed above, current financial management systems are typically software applications and/or web-based services, which, along with a parent computing system, server system, or device, help individuals/users manage their finances by providing a centralized interface with banks, credit card companies, asset account providers, mortgage companies, retirement account providers, and other various financial and asset management institutions and/or accounts, for identifying, processing, storing, and categorizing user financial transactions. Currently, financial management systems typically obtain financial transaction data, such as payee identification, payment amount, date of the transaction, time of transaction, etc., via communication with banks, credit card providers, or other financial institutions, using data entry, and/or links to databases, and/or screen scraping technology, and/or electronic data transfer systems, such as the Open Financial Exchange (OFX) specification, and/or various other systems for obtaining and transferring financial transaction data.

Using some financial management systems, the financial transaction data, payee identification, payment amount, date of the transaction, various descriptions, tags and/or labels, and/or other identifying data is used by the financial management system to identify, categorize, and/or tag individual financial transactions as a particular type of income or expense, to generate various financial reports, and to create an overview of the user's financial situation based on input from multiple, and preferably all, available sources of financial information/data regarding a user. To this end, many financial management systems define their own financial transaction categories.

In some embodiments, the financial transaction categories are defined by outside agencies such as, but not limited to, the Internal Revenue Service (IRS) or other state and local tax agencies.

In various embodiments, the financial transaction categories defined include, but are not limited to, one or more the following: entertainment categories, such as arts, amusement, music, movies and DVDs, newspaper and magazines, etc.; shopping categories, such as clothing, books, electronics and software, hobbies, sporting goods, etc.; personal care categories, such as hair, spa and massage, etc.; health and fitness categories, such as gym, sports, etc.; kids categories, such as toys, kid activities, allowance, etc.; food and dining categories, such as coffee, fast food, restaurants, alcohol, etc.; gift and donation categories, such as, gifts, charity, etc.; pet and pet care categories, such as, pet grooming, etc.; financial transaction categories, such as, life insurance, financial advisor fees, accountant fees, etc.; home categories, such as, furnishings, lawn and garden, home improvement, television, cable, home phone, Internet, mobile phone, etc.; travel categories, such as, air travel, hotel expenses, rental car and taxi expenses, vacation, etc.; uncategorized/undetermined transactions such as, cash ATM transactions, check transactions, transfer transactions, credit card payments, etc.; investment categories, such as, deposits, withdrawals, dividends and capital, buy, sell, etc.; and/or any other financial transaction categories defined and/or discussed herein, and/or as known in the art at the time of filing, and/or as developed after the time of filing.

In one embodiment, at least one Uber financial transaction category, a first Uber financial transaction category, is defined at DEFINE A FIRST UBER FINANCIAL TRANSACTION CATEGORY OPERATION 213. In various embodiments, the Uber financial transaction categories are broad financial transaction categories that include, or encompass, one or more of the financial transaction categories discussed above.

In one embodiment, the Uber financial transaction categories are defined in pairs of Uber financial transaction categories that are representative of a broad categorization of various subsets of financial transaction categories.

For instance, in one specific example, the pair of Uber financial transaction categories is a "wants" Uber financial transaction category representing discretionary spending financial transactions and a "needs" Uber financial transaction category representing non-discretionary financial transactions. In this specific illustrative example, the Uber financial transaction categories are used to distinguish between financial transactions, and associated financial transaction categories, over which the user has control, i.e., that are associated with spending that is not required, but rather represents desired spending on a "wanted" item or service, as opposed to financial transactions, and associated financial transaction categories, over which the user has no control, i.e., that are associated with spending that is required and is not optional, such as utilities, rent, mortgage, etc.

In various embodiments, the first Uber financial transaction category of DEFINE A FIRST UBER FINANCIAL TRANSACTION CATEGORY OPERATION 213 can be either the "wants" Uber financial transaction category or the "needs" Uber financial transaction category.

As noted above, one long standing problem associated with traditional financial management systems displays is the inability to present users their financial information in an efficient, relevant, intuitive, interactive, and dynamic way that is of practical use. However, by dividing the user's spending transactions between relatively few, in one embodiment only one, Uber financial transaction categories, the user is provided a straightforward display illustrating, in this specific illustrative example, how much the user is spending on items and services that are needed, and therefore not discretionary, versus how much the user is spending on items and services that are not needed, but which are desired.

Another example of pairs of Uber financial transaction categories include, but are not limited to, a "good" and "bad" spending Uber financial transaction category pair through which the users financial transactions are divided between financial transactions representing good spending habits and financial transactions representing bad spending habits.

In various embodiments, the first Uber financial transaction category of DEFINE A FIRST UBER FINANCIAL TRANSACTION CATEGORY OPERATION 213 can be either the "good" spending Uber financial transaction category or the "bad" spending Uber financial transaction category.

Another example of pairs of Uber financial transaction categories include, but are not limited to, a "discretionary" and "non-discretionary" Uber financial transaction category pair. This Uber financial transaction category pair is very similar to the wants and needs pair discussed above.

In various embodiments, the first Uber financial transaction category of DEFINE A FIRST UBER FINANCIAL TRANSACTION CATEGORY OPERATION 213 can be either the "discretionary" Uber financial transaction category or the "non-discretionary" Uber financial transaction category.

Another example of pairs of Uber financial transaction categories include, but are not limited to, a "worth it" and "not worth it" Uber financial transaction category pair. This Uber financial transaction category pair is used to divide financial transactions into those that are deemed worth the expenditure and those that are deemed not worth the expenditure. This Uber financial transaction category pairing allows a user to examine, and presumably learn from, previous spending habits.

In various embodiments, the first Uber financial transaction category of DEFINE A FIRST UBER FINANCIAL TRANSACTION CATEGORY OPERATION 213 can be either the "worth it" Uber financial transaction category or the "not worth it" Uber financial transaction category.

Another example of pairs of Uber financial transaction categories include, but are not limited to, a "would repeat" and "would not repeat" Uber financial transaction category pair. This Uber financial transaction category pair is similar to the "worth it" and "not worth it" financial transaction category pair discussed above.

In various embodiments, the first Uber financial transaction category of DEFINE A FIRST UBER FINANCIAL TRANSACTION CATEGORY OPERATION 213 can be either the "would repeat" Uber financial transaction category or the "would not repeat" Uber financial transaction category.

Other examples of pairs of Uber financial transaction categories include any Uber financial transaction categories as discussed herein, and/or as known in the art at the time of filing, and/or as developed after the time of filing. In various embodiments, the first Uber financial transaction category of DEFINE A FIRST UBER FINANCIAL TRANSACTION CATEGORY OPERATION 213 can be any Uber financial transaction category as discussed herein, and/or as known in the art at the time of filing, and/or as developed after the time of filing.

In one embodiment, once the first Uber financial transaction category is defined, first Uber financial transaction category data representing the defined first Uber financial transaction category is generated at DEFINE A FIRST UBER FINANCIAL TRANSACTION CATEGORY OPERATION 213.

In one embodiment, once the first Uber financial transaction category is defined and first Uber financial transaction category data is generated at DEFINE A FIRST UBER FINANCIAL TRANSACTION CATEGORY OPERATION 213, a subset of the financial transaction categories is mapped to the first Uber financial transaction category.

This mapping of the one or more financial transaction categories to the first Uber financial transaction category represents the fact that some defined financial transaction categories, such as, for instance, the financial transaction categories of rent, utilities, car repair, insurance payments, etc. are almost always identifiable as, for example, needs-based, or non-discretionary, financial transactions, and therefore should always be mapped to the needs/non-discretionary Uber financial transaction category and never mapped to the wants/discretionary Uber financial transaction category. In contrast, some defined financial transaction categories, such as entertainment, pet grooming, vacation, etc., are almost always wants-based financial transactions, and therefore should always be mapped to the wants Uber financial transaction category and never to the needs/non-discretionary Uber financial transaction category.

However, some financial transaction categories, and associated financial transactions, are either uncategorized or are categorized in financial transaction categories which are not clearly mapped to any Uber financial transaction categories. For instance, the financial transaction categories shopping, clothing, personal care, hair, kids, kids' activities, allowance, food and dining, pets, home, home furnishings, ATM transactions, check transactions, withdraw transaction, etc., are mapped to either the needs/non-discretionary Uber financial transaction category, or the wants/discretionary Uber financial transaction category, depending on the specific financial transaction. As an illustrative example, a given financial transaction categorized as clothing could either be a purchase of business attire necessary to keep one's job, in which case it would clearly be mapped to the needs/non-discretionary Uber financial transaction category, or it could represent a purchase of a new party dress or hobby related clothing which would most likely be mapped to the wants/discretionary Uber financial transaction category.

Consequently, in one embodiment, those financial transaction categories, and associated financial transactions, that are clearly, or most likely, related to purchases associated with the first Uber financial transaction category are automatically mapped to the first Uber financial transaction category and those financial transaction categories, and associated financial transactions, that are clearly, or most likely, related to purchases associated another Uber financial transaction category are not automatically mapped to the first Uber financial transaction category. In addition, those financial transactions that are either not categorized, or are categorized using financial transaction categories that are not clearly associated with the first Uber financial transaction category, or any Uber financial transaction category, are designated uncategorized/undetermined financial transactions and are therefore not mapped to the first Uber financial transaction category, but are instead accumulated in a set of uncategorized/undetermined financial transaction data representing the uncategorized/undetermined financial transactions.

In some embodiments, the initial mapping of the financial transaction categories to the first Uber financial transaction category is performed by the provider of process 200 for providing a spending analysis display dynamically adapted to defined categories of day and/or date. In some embodiments, the initial mapping of the financial transaction categories to the first Uber financial transaction category performed by the provider of process 200 for providing a spending analysis display dynamically adapted to defined categories of day and/or date can then be modified by the user, or as a result of feedback received during the operation of process 200 for providing a spending analysis display dynamically adapted to defined categories of day and/or date.

In other embodiments, the mapping of the financial transaction categories to the first Uber financial transaction category is performed by the user and this initial mapping can be modified by the user for various reasons. For instance, while financial transactions related to purchasing coffee might be initially mapped by either the user or the provider of process 200 for providing a spending analysis display dynamically adapted to defined categories of day and/or date to the first Uber financial transaction category, in one embodiment, the user may change this mapping to another Uber financial transaction category, or to the uncategorized/undetermined financial transaction category. One reason a user might wish to change the mapping of a financial transaction category to the uncategorized/undetermined financial transaction category would be to force the user to visualize and interact with a specific category of financial transactions, as discussed below.

Continuing with the specific illustrative example set forth above, in one embodiment, discretionary spending is defined as the first Uber financial transaction category. For instance see DEFINE A DISCRETIONARY SPENDING FINANCIAL TRANSACTION CATEGORY OPERATION 313 of FIG. 3

Returning to FIG. 2, once a first Uber financial transaction category is defined at DEFINE A FIRST UBER FINANCIAL TRANSACTION CATEGORY OPERATION 213 process flow proceeds to OBTAIN FINANCIAL TRANSACTION DATA REPRESENTING ONE OR MORE FINANCIAL TRANSACTIONS ASSOCIATED WITH A USER CONDUCTED DURING THE COMPARISON TIMEFRAME OPERATION 215.

In one embodiment, at OBTAIN FINANCIAL TRANSACTION DATA REPRESENTING ONE OR MORE FINANCIAL TRANSACTIONS ASSOCIATED WITH A USER CONDUCTED DURING THE COMPARISON TIMEFRAME OPERATION 215 financial transaction data representing one or more financial transactions associated with the user conducted during the comparison timeframe of DEFINE A COMPARISON TIMEFRAME OPERATION 207 is obtained.

In one embodiment, the financial transaction data is obtained at OBTAIN FINANCIAL TRANSACTION DATA REPRESENTING ONE OR MORE FINANCIAL TRANSACTIONS ASSOCIATED WITH A USER CONDUCTED DURING THE COMPARISON TIMEFRAME OPERATION 215 from one or more financial management systems, such as any of the financial management systems discussed herein, and/or as known in the art at the time of filing, and/or as developed after the time of filing, and/or by any means as discussed herein, and/or as known in the art at the time of filing, and/or as becomes known after the time of filing.

In one embodiment, the financial transaction data of OBTAIN FINANCIAL TRANSACTION DATA REPRESENTING ONE OR MORE FINANCIAL TRANSACTIONS ASSOCIATED WITH A USER CONDUCTED DURING THE COMPARISON TIMEFRAME OPERATION 215 is financial transaction data from the defined comparison timeframe including any of the defined comparison timeframes discussed above with respect to DEFINE A COMPARISON TIMEFRAME OPERATION 207.

Continuing with the specific illustrative example set forth above, in one embodiment, financial transaction data representing one or more financial transactions associated with a user conducted during the previous 30 days is obtained, in one example, from a financial transaction management system.

In one embodiment, once financial transaction data representing one or more financial transactions associated with a user conducted during the comparison timeframe is obtained at OBTAIN FINANCIAL TRANSACTION DATA REPRESENTING ONE OR MORE FINANCIAL TRANSACTIONS ASSOCIATED WITH A USER CONDUCTED DURING THE COMPARISON TIMEFRAME OPERATION 215, process flow proceeds to IDENTIFY ONE OR MORE FINANCIAL TRANSACTIONS ASSOCIATED WITH A USER CONDUCTED DURING THE ONE OR MORE FIRST CATEGORY TIME PERIODS THAT OCCURRED IN THE DEFINED COMPARISON TIMEFRAME AND THAT ARE MAPPED TO THE FIRST UBER FINANCIAL TRANSACTION CATEGORY OPERATION 217.

In one embodiment, at IDENTIFY ONE OR MORE FINANCIAL TRANSACTIONS ASSOCIATED WITH A USER CONDUCTED DURING THE ONE OR MORE FIRST CATEGORY TIME PERIODS THAT OCCURRED IN THE DEFINED COMPARISON TIMEFRAME AND THAT ARE MAPPED TO THE FIRST UBER FINANCIAL TRANSACTION CATEGORY OPERATION 217 analysis is performed on the financial transaction data of OBTAIN FINANCIAL TRANSACTION DATA REPRESENTING ONE OR MORE FINANCIAL TRANSACTIONS ASSOCIATED WITH A USER CONDUCTED DURING THE COMPARISON TIMEFRAME OPERATION 215 to identify one or more financial transactions associated with a user conducted during the one or more first category time periods of DEFINE ONE OR MORE FIRST CATEGORY TIME PERIODS OPERATION 203 that occurred in the defined comparison timeframe of DEFINE A COMPARISON TIMEFRAME OPERATION 207 and that are mapped to the first Uber financial transaction category of DEFINE A FIRST UBER FINANCIAL TRANSACTION CATEGORY OPERATION 213.

In one embodiment, once the financial transaction data is obtained, as many of the financial transactions represented in the financial transaction data are categorized in the financial transaction categories as is possible.

In one embodiment, as many of the categorized financial transactions, and as much categorized financial transaction data, as possible is mapped to the first Uber financial transaction category using the financial transaction category to Uber financial transaction category mapping discussed above.

In one embodiment, as a result of the categorization and mapping of the financial transactions represented in the financial transaction data, each of the financial transactions represented in the financial transaction data is assigned to one of three general categories; the first Uber financial transaction category, any Uber financial transaction category other than the first Uber financial transaction category, or the uncategorized/undetermined financial transaction category.

In one embodiment, all of the financial transactions represented in the financial transaction data mapped to the first Uber financial transaction category are also analyzed to identify financial transactions represented in the financial transaction data mapped to the first Uber financial transaction category and conducted during the one or more first category time periods.

Continuing with the specific illustrative example set forth above, in one embodiment, the financial transaction data representing one or more financial transactions associated with a user conducted during the previous 30 days is analyzed to identify discretionary spending related financial transactions associated with a user conducted during the previous 30 days on work days/weekdays.

In one embodiment, once analysis is performed on the financial transaction data to identify one or more financial transactions associated with a user conducted during the one or more first category time periods that occurred in the defined comparison timeframe and that are mapped to the first Uber financial transaction category at IDENTIFY ONE OR MORE FINANCIAL TRANSACTIONS ASSOCIATED WITH A USER CONDUCTED DURING THE ONE OR MORE FIRST CATEGORY TIME PERIODS THAT OCCURRED IN THE DEFINED COMPARISON TIMEFRAME AND THAT ARE MAPPED TO THE FIRST UBER FINANCIAL TRANSACTION CATEGORY OPERATION 217, process flow proceeds to IDENTIFY ONE OR MORE FINANCIAL TRANSACTIONS ASSOCIATED WITH THE USER CONDUCTED DURING THE ONE OR MORE SECOND CATEGORY TIME PERIODS THAT OCCURRED IN THE DEFINED COMPARISON TIMEFRAME AND THAT ARE MAPPED TO THE FIRST UBER FINANCIAL TRANSACTION CATEGORY OPERATION 219.

In one embodiment, at IDENTIFY ONE OR MORE FINANCIAL TRANSACTIONS ASSOCIATED WITH THE USER CONDUCTED DURING THE ONE OR MORE SECOND CATEGORY TIME PERIODS THAT OCCURRED IN THE DEFINED COMPARISON TIMEFRAME AND THAT ARE MAPPED TO THE FIRST UBER FINANCIAL TRANSACTION CATEGORY OPERATION 219 all of the financial transactions represented in the financial transaction data of OBTAIN FINANCIAL TRANSACTION DATA REPRESENTING ONE OR MORE FINANCIAL TRANSACTIONS ASSOCIATED WITH A USER CONDUCTED DURING THE COMPARISON TIMEFRAME OPERATION 215 mapped to the first Uber financial transaction category of DEFINE A FIRST UBER FINANCIAL TRANSACTION CATEGORY OPERATION 213 are also analyzed to identify financial transactions represented in the financial transaction data mapped to the first Uber financial transaction category and conducted during the one or more second category time periods of DEFINE ONE OR MORE SECOND CATEGORY TIME PERIODS OPERATION 205.

Continuing with the specific illustrative example set forth above, in one embodiment, the financial transaction data representing one or more financial transactions associated with a user conducted during the previous 30 days is analyzed to identify discretionary spending related financial transactions associated with a user conducted during the previous 30 days on non-work days/weekend days.

In one embodiment, once all of the financial transactions represented in the financial transaction data mapped to the first Uber financial transaction category are also analyzed to identify financial transactions represented in the financial transaction data mapped to the first Uber financial transaction category and conducted during the one or more second category time periods at IDENTIFY ONE OR MORE FINANCIAL TRANSACTIONS ASSOCIATED WITH THE USER CONDUCTED DURING THE ONE OR MORE SECOND CATEGORY TIME PERIODS THAT OCCURRED IN THE DEFINED COMPARISON TIMEFRAME AND THAT ARE MAPPED TO THE FIRST UBER FINANCIAL TRANSACTION CATEGORY OPERATION 219, process flow proceeds to CALCULATE A FIRST UBER FINANCIAL TRANSACTION CATEGORY FIRST CATEGORY TIME PERIOD CUMULATIVE AMOUNT OPERATION 221.

In one embodiment, at CALCULATE A FIRST UBER FINANCIAL TRANSACTION CATEGORY FIRST CATEGORY TIME PERIOD CUMULATIVE AMOUNT OPERATION 221 a first Uber financial transaction category first category time period cumulative amount representing the cumulative total of the amounts of the financial transactions represented in the financial transaction data mapped to the first Uber financial transaction category and conducted during the one or more first category time periods of IDENTIFY ONE OR MORE FINANCIAL TRANSACTIONS ASSOCIATED WITH A USER CONDUCTED DURING THE ONE OR MORE FIRST CATEGORY TIME PERIODS THAT OCCURRED IN THE DEFINED COMPARISON TIMEFRAME AND THAT ARE MAPPED TO THE FIRST UBER FINANCIAL TRANSACTION CATEGORY OPERATION 217 is calculated.

Consequently, as a specific illustrative example, in one embodiment, at CALCULATE A FIRST UBER FINANCIAL TRANSACTION CATEGORY FIRST CATEGORY TIME PERIOD CUMULATIVE AMOUNT OPERATION 221 all of the financial transactions represented in the financial transaction data mapped to the wants/discretionary Uber financial transaction category that were conducted on work days/weekdays are accumulated and a cumulative total of the amounts of the financial transactions mapped to the wants/discretionary financial transaction category conducted on work days/weekdays is calculated to reveal the user's total spending for the comparison timeframe in the wants/discretionary Uber financial transaction category conducted on work days/weekdays.

Continuing with the specific illustrative example set forth above, first Uber financial transaction category first category time period cumulative amount is calculated by adding total of the amounts of the identified discretionary spending related financial transactions associated with a user conducted during the previous 30 days on work days/weekdays. In this specific illustrative example, we stipulate that the first Uber financial transaction category first category time period cumulative amount is calculated as $940.00.

In one embodiment, once a first Uber financial transaction category first category time period cumulative amount representing the cumulative total of the amounts of the financial transactions represented in the financial transaction data mapped to the first Uber financial transaction category and conducted during the one or more first category time periods is calculated at CALCULATE A FIRST UBER FINANCIAL TRANSACTION CATEGORY FIRST CATEGORY TIME PERIOD CUMULATIVE AMOUNT OPERATION 221, process flow proceeds to CALCULATE A FIRST UBER FINANCIAL TRANSACTION CATEGORY SECOND CATEGORY TIME PERIOD CUMULATIVE AMOUNT OPERATION 223.

In one embodiment, at CALCULATE A FIRST UBER FINANCIAL TRANSACTION CATEGORY SECOND CATEGORY TIME PERIOD CUMULATIVE AMOUNT OPERATION 223 a second Uber financial transaction category second category time period cumulative amount representing cumulative total of the amounts of the financial transactions represented in the financial transaction data mapped to the first Uber financial transaction category and conducted during the one or more second category time periods of IDENTIFY ONE OR MORE FINANCIAL TRANSACTIONS ASSOCIATED WITH THE USER CONDUCTED DURING THE ONE OR MORE SECOND CATEGORY TIME PERIODS THAT OCCURRED IN THE DEFINED COMPARISON TIMEFRAME AND THAT ARE MAPPED TO THE FIRST UBER FINANCIAL TRANSACTION CATEGORY OPERATION 219 is calculated.

Consequently, as a specific illustrative example, in one embodiment, at CALCULATE A FIRST UBER FINANCIAL TRANSACTION CATEGORY SECOND CATEGORY TIME PERIOD CUMULATIVE AMOUNT OPERATION 223 all of the financial transactions represented in the financial transaction data mapped to the wants/discretionary Uber financial transaction category that were conducted on non-work days/weekend days are accumulated and a cumulative total of the amounts of the financial transactions mapped to the wants/discretionary financial transaction category conducted on non-work days/weekend days is calculated to reveal the user's total spending for the comparison timeframe in the wants/discretionary Uber financial transaction category conducted on non-work days/weekend days.

Continuing with the specific illustrative example set forth above, a first Uber financial transaction category second category time period cumulative amount is calculated by adding total of the amounts of the identified discretionary spending related financial transactions associated with a user conducted during the previous 30 days on non-work days/weekend days. In this specific illustrative example, we stipulate that the first Uber financial transaction category second category time period cumulative amount is calculated as $910.00.

In one embodiment, once a second Uber financial transaction category second category time period cumulative amount representing cumulative total of the amounts of the financial transactions represented in the financial transaction data mapped to the first Uber financial transaction category and conducted during the one or more second category time periods is calculated at CALCULATE A FIRST UBER FINANCIAL TRANSACTION CATEGORY SECOND CATEGORY TIME PERIOD CUMULATIVE AMOUNT OPERATION 223, process flow proceeds to CALCULATE AN AVERAGE FIRST UBER FINANCIAL TRANSACTION CATEGORY FIRST CATEGORY TIME PERIOD AMOUNT OPERATION 225.

In one embodiment, at CALCULATE AN AVERAGE FIRST UBER FINANCIAL TRANSACTION CATEGORY FIRST CATEGORY TIME PERIOD AMOUNT OPERATION 225, an average first Uber financial transaction category first category time period amount is calculated by dividing the first Uber financial transaction category first category time period cumulative amount of CALCULATE A FIRST UBER FINANCIAL TRANSACTION CATEGORY FIRST CATEGORY TIME PERIOD CUMULATIVE AMOUNT OPERATION 221 by the comparison timeframe first category time period number of CALCULATE A COMPARISON TIMEFRAME FIRST CATEGORY TIME PERIOD NUMBER OPERATION 209.

Continuing with the specific illustrative example set forth above, an average first Uber financial transaction category first category time period amount is calculated by dividing the first Uber financial transaction category first category time period cumulative amount of $940.00 by the comparison timeframe first category time period number of 20 to yield an average first Uber financial transaction category first category time period amount of $47.00.

In one embodiment, once an average first Uber financial transaction category first category time period amount is calculated by dividing the first Uber financial transaction category first category time period cumulative amount by the comparison timeframe first category time period number at CALCULATE AN AVERAGE FIRST UBER FINANCIAL TRANSACTION CATEGORY FIRST CATEGORY TIME PERIOD AMOUNT OPERATION 225, process flow proceeds to CALCULATE AN AVERAGE FIRST UBER FINANCIAL TRANSACTION CATEGORY SECOND CATEGORY TIME PERIOD AMOUNT OPERATION 227.

In one embodiment, at CALCULATE AN AVERAGE FIRST UBER FINANCIAL TRANSACTION CATEGORY SECOND CATEGORY TIME PERIOD AMOUNT OPERATION 227, an average first Uber financial transaction category second category time period amount is calculated by dividing the first Uber financial transaction category second category time period cumulative amount of CALCULATE A FIRST UBER FINANCIAL TRANSACTION CATEGORY SECOND CATEGORY TIME PERIOD CUMULATIVE AMOUNT OPERATION 223 by the comparison timeframe second category time period number of CALCULATE A COMPARISON TIMEFRAME SECOND CATEGORY TIME PERIOD NUMBER OPERATION 211.

Continuing with the specific illustrative example set forth above, an average first Uber financial transaction category second category time period amount is calculated by dividing the second Uber financial transaction category first category time period cumulative amount of $910.00 by the comparison timeframe second category time period number of 10 to yield an average first Uber financial transaction category second category time period amount of $91.00.

In one embodiment, once an average first Uber financial transaction category second category time period amount is calculated by dividing the first Uber financial transaction category second category time period cumulative amount by the comparison timeframe second category time period number at CALCULATE AN AVERAGE FIRST UBER FINANCIAL TRANSACTION CATEGORY SECOND CATEGORY TIME PERIOD AMOUNT OPERATION 227, process flow proceeds to DETERMINE IF THE CURRENT TIME IS IN THE FIRST CATEGORY TIME PERIOD OR THE SECOND CATEGORY TIME PERIOD FOR THE USER OPERATION 229.

In one embodiment, at DETERMINE IF THE CURRENT TIME IS IN THE FIRST CATEGORY TIME PERIOD OR THE SECOND CATEGORY TIME PERIOD FOR THE USER OPERATION 229, a determination is made as to whether a current time is in the first category time period of DEFINE ONE OR MORE FIRST CATEGORY TIME PERIODS OPERATION 203 or the second category time period of DEFINE ONE OR MORE SECOND CATEGORY TIME PERIODS OPERATION 205 for the user.

In one embodiment, at DETERMINE IF THE CURRENT TIME IS IN THE FIRST CATEGORY TIME PERIOD OR THE SECOND CATEGORY TIME PERIOD FOR THE USER OPERATION 229 the determination as to whether a current time is in the first category time period or the second category time period is made based on current time data received from a user computing system associated with the user, and/or GPS data provided by a user computing system associated with the user.

In one embodiment, the determination of DETERMINE IF THE CURRENT TIME IS IN THE FIRST CATEGORY TIME PERIOD OR THE SECOND CATEGORY TIME PERIOD FOR THE USER OPERATION 229 as to whether a current time is in the first category time period or the second category time period is made based on data provided by the user.

In various embodiments, the determination as to whether a current time is in the first category time period or the second category time period is made at DETERMINE IF THE CURRENT TIME IS IN THE FIRST CATEGORY TIME PERIOD OR THE SECOND CATEGORY TIME PERIOD FOR THE USER OPERATION 229 based on data from any source of current time data discussed herein, and/or as known in the art at the time of filing, and/or as developed after the time of filing.

In one embodiment, once a determination is made as to whether a current time is in the first category time period or the second category time period for the user at DETERMINE IF THE CURRENT TIME IS IN THE FIRST CATEGORY TIME PERIOD OR THE SECOND CATEGORY TIME PERIOD FOR THE USER OPERATION 229, process flow proceeds to IF THE CURRENT TIME IS IN THE FIRST CATEGORY TIME PERIOD, GENERATE A SPENDING ANALYSIS DISPLAY INCLUDING A FIRST UBER FINANCIAL TRANSACTION CATEGORY ANALYSIS NUMBER CALCULATED BASED ON THE CALCULATED AVERAGE FIRST UBER FINANCIAL TRANSACTION CATEGORY FIRST CATEGORY TIME PERIOD AMOUNT OPERATION 231.

In one embodiment, at IF THE CURRENT TIME IS IN THE FIRST CATEGORY TIME PERIOD, GENERATE A SPENDING ANALYSIS DISPLAY INCLUDING A FIRST UBER FINANCIAL TRANSACTION CATEGORY ANALYSIS NUMBER CALCULATED BASED ON THE CALCULATED AVERAGE FIRST UBER FINANCIAL TRANSACTION CATEGORY FIRST CATEGORY TIME PERIOD AMOUNT OPERATION 231, if the current time is determined to be in the first category time period for the user at DETERMINE IF THE CURRENT TIME IS IN THE FIRST CATEGORY TIME PERIOD OR THE SECOND CATEGORY TIME PERIOD FOR THE USER OPERATION 229, the first Uber financial transaction category analysis display region of a generated spending analysis display includes a first Uber financial transaction category analysis number calculated based on the calculated average first Uber financial transaction category first category time period amount.

In various embodiments, the first Uber financial transaction category analysis number calculated and displayed at IF THE CURRENT TIME IS IN THE FIRST CATEGORY TIME PERIOD, GENERATE A SPENDING ANALYSIS DISPLAY INCLUDING A FIRST UBER FINANCIAL TRANSACTION CATEGORY ANALYSIS NUMBER CALCULATED BASED ON THE CALCULATED AVERAGE FIRST UBER FINANCIAL TRANSACTION CATEGORY FIRST CATEGORY TIME PERIOD AMOUNT OPERATION 231 is simply the average first Uber financial transaction category first category time period amount of CALCULATE AN AVERAGE FIRST UBER FINANCIAL TRANSACTION CATEGORY FIRST CATEGORY TIME PERIOD AMOUNT OPERATION 225.

In other embodiments, the first Uber financial transaction category analysis number calculated and displayed at IF THE CURRENT TIME IS IN THE FIRST CATEGORY TIME PERIOD, GENERATE A SPENDING ANALYSIS DISPLAY INCLUDING A FIRST UBER FINANCIAL TRANSACTION CATEGORY ANALYSIS NUMBER CALCULATED BASED ON THE CALCULATED AVERAGE FIRST UBER FINANCIAL TRANSACTION CATEGORY FIRST CATEGORY TIME PERIOD AMOUNT OPERATION 231 is a further processed number determined based on the average first Uber financial transaction category first category time period amount of CALCULATE AN AVERAGE FIRST UBER FINANCIAL TRANSACTION CATEGORY FIRST CATEGORY TIME PERIOD AMOUNT OPERATION 225. For instance, in one embodiment, the first Uber financial transaction category analysis number is the average first Uber financial transaction category first category time period amount minus recent transaction amounts categorized as being in the first Uber financial transaction category to reveal an amount left for spending in the first Uber financial transaction category.

Continuing with the specific illustrative example set forth above, if the current time is determined to be a work day/weekday for the user, the calculated average first Uber financial transaction category first category time period amount of $47.00 is displayed in the first Uber financial transaction category analysis display region. A specific illustrative example of this first Uber financial transaction category analysis display region is shown in FIG. 4 and is discussed above.

Returning to FIG. 2, in one embodiment, once the first Uber financial transaction category analysis display region of a generated spending analysis display includes a first Uber financial transaction category analysis number calculated based on the calculated average first Uber financial transaction category first category time period amount if the current time is determined to be in the first category time period for the user at DETERMINE IF THE CURRENT TIME IS IN THE FIRST CATEGORY TIME PERIOD OR THE SECOND CATEGORY TIME PERIOD FOR THE USER OPERATION 229 at IF THE CURRENT TIME IS IN THE FIRST CATEGORY TIME PERIOD, GENERATE A SPENDING ANALYSIS DISPLAY INCLUDING A FIRST UBER FINANCIAL TRANSACTION CATEGORY ANALYSIS NUMBER CALCULATED BASED ON THE CALCULATED AVERAGE FIRST UBER FINANCIAL TRANSACTION CATEGORY FIRST CATEGORY TIME PERIOD AMOUNT OPERATION 231, process flow proceeds to IF THE CURRENT TIME IS IN THE SECOND CATEGORY TIME PERIOD, GENERATE A SPENDING ANALYSIS DISPLAY INCLUDING A FIRST UBER FINANCIAL TRANSACTION CATEGORY ANALYSIS NUMBER CALCULATED BASED ON THE CALCU- LATED AVERAGE FIRST UBER FINANCIAL TRANSACTION CATEGORY SECOND CATEGORY TIME PERIOD AMOUNT OPERATION 233.

In one embodiment, at IF THE CURRENT TIME IS IN THE SECOND CATEGORY TIME PERIOD, GENERATE A SPENDING ANALYSIS DISPLAY INCLUDING A FIRST UBER FINANCIAL TRANSACTION CATEGORY ANALYSIS NUMBER CALCULATED BASED ON THE CALCULATED AVERAGE FIRST UBER FINANCIAL TRANSACTION CATEGORY SECOND CATEGORY TIME PERIOD AMOUNT OPERATION 233, if the current time is determined to be in the second category time period for the user at DETERMINE IF THE CURRENT TIME IS IN THE FIRST CATEGORY TIME PERIOD OR THE SECOND CATEGORY TIME PERIOD FOR THE USER OPERATION 229, the first Uber financial transaction category analysis display region of the generated spending analysis display includes a first Uber financial transaction category analysis number calculated based on the calculated average first Uber financial transaction category second category time period amount of CALCULATE AN AVERAGE FIRST UBER FINANCIAL TRANSACTION CATEGORY SECOND CATEGORY TIME PERIOD AMOUNT OPERATION 227. A specific illustrative example of this first Uber financial transaction category analysis display region is shown in FIG. 5 and is discussed above.

In various embodiments, the first Uber financial transaction category analysis number calculated and displayed at IF THE CURRENT TIME IS IN THE SECOND CATEGORY TIME PERIOD, GENERATE A SPENDING ANALYSIS DISPLAY INCLUDING A FIRST UBER FINANCIAL TRANSACTION CATEGORY ANALYSIS NUMBER CALCULATED BASED ON THE CALCULATED AVERAGE FIRST UBER FINANCIAL TRANSACTION CATEGORY SECOND CATEGORY TIME PERIOD AMOUNT OPERATION 233 is simply the average first Uber financial transaction category second category time period amount of CALCULATE AN AVERAGE FIRST UBER FINANCIAL TRANSACTION CATEGORY SECOND CATEGORY TIME PERIOD AMOUNT OPERATION 227.

In other embodiments, the first Uber financial transaction category analysis number calculated and displayed at IF THE CURRENT TIME IS IN THE SECOND CATEGORY TIME PERIOD, GENERATE A SPENDING ANALYSIS DISPLAY INCLUDING A FIRST UBER FINANCIAL TRANSACTION CATEGORY ANALYSIS NUMBER CALCULATED BASED ON THE CALCULATED AVERAGE FIRST UBER FINANCIAL TRANSACTION CATEGORY SECOND CATEGORY TIME PERIOD AMOUNT OPERATION 233 is a further processed number determined based on the average first Uber financial transaction category second category time period amount of CALCULATE AN AVERAGE FIRST UBER FINANCIAL TRANSACTION CATEGORY SECOND CATEGORY TIME PERIOD AMOUNT OPERATION 227. For instance, in one embodiment, the first Uber financial transaction category analysis number is the average first Uber financial transaction category second category time period amount minus recent transaction amounts categorized as being in the first Uber financial transaction category to reveal an amount left for spending in the first Uber financial transaction category.

Continuing with the specific illustrative example set forth above, if the current time is determined to be a non-work day/weekend day for the user, the calculated average first Uber financial transaction category second category time period amount of $91.00 is displayed.

In one embodiment, once the first Uber financial transaction category analysis display region of the generated spending analysis display includes a first Uber financial transaction category analysis number calculated based on the calculated average first Uber financial transaction category second category time period amount if the current time is determined to be in the second category time period for the user at DETERMINE IF THE CURRENT TIME IS IN THE FIRST CATEGORY TIME PERIOD OR THE SECOND CATEGORY TIME PERIOD FOR THE USER OPERATION 229, at IF THE CURRENT TIME IS IN THE SECOND CATEGORY TIME PERIOD, GENERATE A SPENDING ANALYSIS DISPLAY INCLUDING A FIRST UBER FINANCIAL TRANSACTION CATEGORY ANALYSIS NUMBER CALCULATED BASED ON THE CALCULATED AVERAGE FIRST UBER FINANCIAL TRANSACTION CATEGORY SECOND CATEGORY TIME PERIOD AMOUNT OPERATION 233, process flow proceeds to PROVIDE THE SPENDING ANALYSIS DISPLAY TO THE USER ON A DISPLAY SCREEN OF A USER COMPUTING SYSTEM OPERATION 235.

In one embodiment, at PROVIDE THE SPENDING ANALYSIS DISPLAY TO THE USER ON A DISPLAY SCREEN OF A USER COMPUTING SYSTEM OPERATION 235, the spending analysis display is made accessible to the user via a display screen of a user computing system.

In one embodiment, once the spending analysis display is made accessible to the user via a display screen of a user computing system at PROVIDE THE SPENDING ANALYSIS DISPLAY TO THE USER ON A DISPLAY SCREEN OF A USER COMPUTING SYSTEM OPERATION 235, process flow proceeds to EXIT OPERATION 240.

In one embodiment, at EXIT OPERATION 240 process 200 for providing a spending analysis display dynamically adapted to defined categories of day and/or date is exited to await new data.

FIG. 3 is a flow chart representing one example of a process 300 for providing a spending analysis display dynamically adapted to defined categories of day and/or date in accordance with one embodiment.

Process 300 for providing a spending analysis display dynamically adapted to defined categories of day and/or date is substantially similar to process 200 for providing a spending analysis display dynamically adapted to defined categories of day and/or date, except that process 300 for providing a spending analysis display dynamically adapted to defined categories of day and/or date represented the specific embodiment, where, after ENTER OPERATION 301: the first category time periods are defined to be weekdays at DEFINE WEEKDAYS AS FIRST CATEGORY TIME PERIODS OPERATION 303; the second category time periods are defined to be weekend days at DEFINE WEEKEND DAYS AS SECOND CATEGORY TIME PERIODS OPERATION 305; the comparison timeframe is defined at DEFINE A COMPARISON TIMEFRAME OPERATION 307 to be any comparison time frame discussed herein; a comparison timeframe weekday number is calculated at CALCULATE A COMPARISON TIMEFRAME WEEKDAY NUMBER OPERATION 309; a comparison timeframe weekend day number is calculated at CALCULATE A COMPARISON TIMEFRAME WEEKEND DAY NUMBER OPERATION 311; a discretionary spending first Uber financial transaction category is defined at DEFINE A DISCRETIONARY SPENDING FINANCIAL TRANSACTION CATEGORY OPERATION 313; financial transaction data is obtained at OBTAIN FINANCIAL TRANSACTION DATA REPRESENTING ONE OR MORE FINANCIAL TRANSACTIONS ASSOCIATED WITH A USER CONDUCTED DURING THE COMPARISON TIMEFRAME OPERATION 315 for the comparison timeframe of DEFINE A COMPARISON TIMEFRAME OPERATION 307; financial transactions conducted during weekdays in the comparison timeframe that are discretionary spending related are identified at IDENTIFY ONE OR MORE FINANCIAL TRANSACTIONS ASSOCIATED WITH A USER CONDUCTED DURING WEEKDAYS THAT OCCURRED IN THE DEFINED COMPARISON TIMEFRAME AND THAT ARE DISCRETIONARY SPENDING FINANCIAL TRANSACTIONS OPERATION 317; financial transactions conducted during weekend days in the comparison timeframe that are discretionary spending related are identified at IDENTIFY ONE OR MORE FINANCIAL TRANSACTIONS ASSOCIATED WITH THE USER CONDUCTED DURING WEEKEND DAYS THAT OCCURRED IN THE DEFINED COMPARISON TIMEFRAME AND THAT ARE DISCRETIONARY SPENDING FINANCIAL TRANSACTIONS OPERATION 319; a discretionary spending financial transactions weekday cumulative amount is calculated at CALCULATE A DISCRETIONARY SPENDING FINANCIAL TRANSACTIONS WEEKDAY CUMULATIVE AMOUNT OPERATION 321; a discretionary spending financial transactions weekend day cumulative amount is calculated at CALCULATE A DISCRETIONARY SPENDING FINANCIAL TRANSACTIONS WEEKEND DAY CUMULATIVE AMOUNT OPERATION 323; an average discretionary spending financial transactions weekday amount is calculated at CALCULATE AN AVERAGE DISCRETIONARY SPENDING FINANCIAL TRANSACTIONS WEEKDAY AMOUNT OPERATION 325; an average discretionary spending financial transactions weekend day amount is calculated at CALCULATE AN DISCRETIONARY SPENDING FINANCIAL TRANSACTIONS WEEKEND DAY AMOUNT OPERATION 327; a determination is made as to whether the current time is a weekday or weekend day for the user at DETERMINE IF THE CURRENT TIME IS A WEEKDAY OR WEEKEND DAY FOR THE USER OPERATION 329; if the current time is determined to be a weekday for the user, the first Uber financial transaction category analysis display region of the generated spending analysis display includes a discretionary weekday spending analysis number at IF THE CURRENT TIME IS A WEEKDAY FOR THE USER, GENERATE A SPENDING ANALYSIS DISPLAY INCLUDING A DISCRETIONARY SPENDING ANALYSIS NUMBER CALCULATED BASED ON THE CALCULATED AVERAGE DISCRETIONARY SPENDING FINANCIAL TRANSACTIONS WEEKDAY AMOUNT OPERATION 331; if the current time is determined to be a weekend day for the user, the first Uber financial transaction category analysis display region of the generated spending analysis display includes a discretionary weekend day spending analysis number at IF THE CURRENT TIME WEEKEND DAY, GENERATE A SPENDING ANALYSIS DISPLAY INCLUDING A DISCRETIONARY SPENDING ANALYSIS NUMBER CALCULATED BASED ON THE CALCULATED AVERAGE DISCRETIONARY SPENDING FINANCIAL TRANSACTIONS WEEKEND DAY AMOUNT OPERATION 333; and the spending analysis display is provided to the user PROVIDE THE SPENDING ANALYSIS DISPLAY TO THE USER ON A DISPLAY SCREEN OF A USER COMPUTING SYSTEM OPERATION 335 before EXIT OPERATION 340.

Using processes 200 and 300 for providing a spending analysis display dynamically adapted to defined categories of day and/or date discussed herein, a solution to the long standing problem of failure to take into account periodically repeating variations in user spending, and in particular, variations in user spending that naturally occur over the course of a day, a week, a month, a quarter, a year, or any defined period of time based on the hours and days of the week the user works, seasonal employment and spending, and/or other particulars of an individual user's life and career that can cause periodically repeating variations in user spending is provided.

Processes 200 and 300 for providing a spending analysis display dynamically adapted to defined categories of day and/or date solve the problem by providing users an intuitive and interactive spending analysis display that is dynamically adapted to the display day and/or date and that allows users to intuitively and easily see their discretionary and non-discretionary spending, to categorize undetermined financial transactions in a relevant and engaging way, and provide simple, user friendly, intuitive, and interactive spending analysis/tracking that is dynamically adjusted/adapted to reflect periodically repeating variations in user spending.

Therefore, processes 200 and 300 for providing a spending analysis display dynamically adapted to defined categories of day and/or date significantly improve the technical fields of data entry/selection and user experience. Therefore, implementations of embodiments of the present disclosure represent a significant improvement to the field of user experience and, in particular, efficient use of human and non-human resources.

In addition, by eliminating the necessity of performing unnecessary analysis and displaying detailed, and often undesired, reports and data, there is less data entry, less processing of data, and fewer errors in entered data. Consequently, using processes 200 and 300 for providing a spending analysis display dynamically adapted to defined categories of day and/or date, fewer processor cycles are utilized, memory utilization is reduced, and less communications bandwidth is utilized to relay data to and from backend systems. As a result, computing systems, and particularly mobile computing systems, are transformed into faster, more efficient, and more effective computing systems by implementing processes 200 and 300 for providing a spending analysis display dynamically adapted to defined categories of day and/or date discussed herein.

As a result, using implementations of processes 200 and 300 for providing a spending analysis display dynamically adapted to defined categories of day and/or date the fields of financial management, financial data processing, data entry, data display, data processing, and user experience are significantly improved.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "accessing," "analyzing," "obtaining," "identifying," "associating," "aggregating," "initiating," "collecting," "creating," "transferring," "storing," "searching," "comparing," "providing," "processing" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes by a computer program stored via a computer program product as defined herein that can be accessed by a computing system or other device to transform the computing system or other device into a specifically and specially programmed computing system or other device.

Those of skill in the art will readily recognize that the algorithms and operations presented herein are not inherently related to any particular computing system, computer architecture, computer or industry standard, or any other specific apparatus. It may prove convenient/efficient to construct or transform one or more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity, and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are identified using a particular nomenclature for ease of description and understanding, but other nomenclature is often used in the art to identify equivalent operations.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Therefore, numerous variations, whether explicitly provided for by the specification or implied by the specification or not, may be implemented by one of skill in the art in view of this disclosure.

What is claimed is:

1. A method for providing a spending analysis display dynamically adapted to defined categories of day and/or date comprising:
    defining one or more first category time periods;
    defining one or more second category time periods, the second category time periods being distinct from the first category time periods;
    defining a comparison timeframe, the comparison timeframe including one or more first category time periods and/or one or more second category time periods;
    calculating a comparison timeframe first category time period number by determining the number of first category time periods that occurred in the defined comparison timeframe;
    calculating a comparison timeframe second category time period number by determining the number of second category time periods that occurred in the defined comparison timeframe;
    defining a first Uber financial transaction category;
    obtaining financial transaction data representing one or more financial transactions associated with a user conducted during the comparison timeframe;
    identifying one or more financial transactions associated with a user conducted during the one or more first category time periods that occurred in the defined comparison timeframe and that are mapped to the first Uber financial transaction category;
    identifying one or more financial transactions associated with the user conducted during the one or more second category time periods that occurred in the defined comparison timeframe and that are mapped to the first Uber financial transaction category;

calculating a first Uber financial transaction category first category time period cumulative amount by determining the total cumulative amount of the one or more financial transactions associated with a user mapped to the first Uber financial transaction category that were conducted during the one or more first category time periods of the comparison timeframe;

calculating a first Uber financial transaction category second category time period cumulative amount by determining the total cumulative amount of the one or more financial transactions associated with a user mapped to the first Uber financial transaction category that were conducted during the one or more second category time periods of the comparison timeframe;

calculating an average first Uber financial transaction category first category time period amount by dividing the first Uber financial transaction category first category time period cumulative amount by the comparison timeframe first category time period number;

calculating an average first Uber financial transaction category second category time period amount by dividing the first Uber financial transaction category second category time period cumulative amount by the comparison timeframe second category time period number;

determining whether a current time is in the first category time period or the second category time period for the user;

generating a spending analysis display, the spending analysis display including a first Uber financial transaction category analysis display region, the spending analysis display being further configured to display a swipe input display which is configured to receive user input in the form of a swiping motion to either the left or right, wherein categorization of an uncategorized transaction is made into a wants category if user input is received of a swiping motion is made in a first direction of either left or right, and categorization of an uncategorized transaction is instead made into a needs category if user input is received of a swiping motion is made in a second direction, the first Uber financial transaction category analysis display region including either:

a first Uber financial transaction category analysis number calculated based on the calculated average first Uber financial transaction category first category time period amount if the current time is determined to be in the first category time period; or a first Uber financial transaction category analysis number calculated based on the calculated average first Uber financial transaction category second category time period amount if the current time is determined to be in the second category time period; and providing the spending analysis display to the user on a display screen of the user computing system.

2. The method for providing a spending analysis display dynamically adapted to defined categories of day and/or date of claim 1 wherein at least one of the one or more first category time periods are selected from the group of first category time periods consisting of:
specified hours of the day;
specified hours of a specified day;
a specified day;
specified days of the week;
specified days of a specified week;
specified days of one or more specified weeks;
specified days of a month;
specified days of a specified month;
specified weeks of a month;
specified days of one or more specified months;
specified weeks of one or more specified months;
a specified month;
one or more specified months;
a specified month of a specified year;
one or more specified months of a specified year;
a specified month of one or more specified years;
one or more specified months of one or more specified years;
a specified year; and
one or more specified years.

3. The method for providing a spending analysis display dynamically adapted to defined categories of day and/or date of claim 1 wherein at least one of the one or more second category time periods are selected from the group of second category time periods that are distinct from the selected first category time periods consisting of:
specified hours of the day;
specified hours of a specified day;
a specified day;
specified days of the week;
specified days of a specified week;
specified days of one or more specified weeks;
specified days of a month;
specified days of a specified month;
specified weeks of a month;
specified days of one or more specified months;
specified weeks of one or more specified months;
a specified month;
one or more specified months;
a specified month of a specified year;
one or more specified months of a specified year;
a specified month of one or more specified years;
one or more specified months of one or more specified years;
a specified year; and
one or more specified years.

4. The method for providing a spending analysis display dynamically adapted to defined categories of day and/or date of claim 1 wherein the comparison timeframe includes at least one of the one or more first category time periods and/or at least one of the one or more second category time periods and is selected from the group of comparison timeframes consisting of:
specified hours of the day;
specified hours of a specified day;
a specified day;
specified days of the week;
specified days of a specified week;
specified days of one or more specified weeks;
specified days of a month;
specified days of a specified month;
specified weeks of a month;
specified days of one or more specified months;
specified weeks of one or more specified months;
a specified month;
one or more specified months;
a specified month of a specified year;
one or more specified months of a specified year;
a specified month of one or more specified years;
one or more specified months of one or more specified years;

a specified year; and
one or more specified years.

5. The method for providing a spending analysis display dynamically adapted to defined categories of day and/or date of claim 1 wherein the first Uber financial transaction category is selected from the group of Uber financial transaction category consisting of:
  a discretionary spending Uber financial transaction category;
  a non-discretionary spending Uber financial transaction category;
  a wants spending Uber financial transaction category
  a needs spending Uber financial transaction category;
  a good spending Uber financial transaction category;
  a bad spending Uber financial transaction category;
  a worth it Uber financial transaction category;
  a not worth it Uber financial transaction category;
  a would repeat Uber financial transaction category; and
  a would not repeat Uber financial transaction category.

6. The method for providing a spending analysis display dynamically adapted to defined categories of day and/or date of claim 1 wherein the financial transaction data representing one or more financial transactions associated with a user conducted during the comparison timeframe is obtained from a financial management system selected from the group of financial management systems consisting of:
  a computing system implemented financial management system;
  a network accessed financial management system;
  a web-based financial management system; and
  a cloud-based financial management system.

7. The method for providing a spending analysis display dynamically adapted to defined categories of day and/or date of claim 1 wherein identifying one or more financial transactions associated with a user conducted during the one or more first category time periods that occurred in the defined comparison timeframe and that are mapped to the first Uber financial transaction category and identifying one or more financial transactions associated with a user conducted during the one or more second category time periods that occurred in the defined comparison timeframe and that are mapped to the first Uber financial transaction category is performed by a financial management system.

8. The method for providing a spending analysis display dynamically adapted to defined categories of day and/or date of claim 7 wherein the financial management system is selected from the group of financial management systems consisting of:
  a computing system implemented financial management system;
  a network accessed financial management system;
  a web-based financial management system; and
  a cloud-based financial management system.

9. The method for providing a spending analysis display dynamically adapted to defined categories of day and/or date of claim 1 wherein determining whether a current time is in the first category time period or the second category time period is performed based on time data obtained from the user computing system and/or a GPS function associated with the user computing system.

10. The method for providing a spending analysis display dynamically adapted to defined categories of day and/or date of claim 1 wherein the first Uber financial transaction category analysis display region includes a graphical display selected from the group of graphical displays consisting of:
  a first color graphic;
  a first icon graphic;
  a first animated graphic;
  a first shape graphic;
  a first symbol graphic;
  a first alpha-numeric graphic; and
  a first avatar graphic.

11. The method for providing a spending analysis display dynamically adapted to defined categories of day and/or date of claim 1 wherein the first Uber financial transaction category analysis display region includes either:
  a first Uber financial transaction category analysis number indicating the calculated average first Uber financial transaction category first category time period amount if the current time is determined to be in the first category time period; or
  a first Uber financial transaction category analysis number calculated indicating the calculated average first Uber financial transaction category second category time period amount if the current time is determined to be in the second category time period.

12. The method for providing a spending analysis display dynamically adapted to defined categories of day and/or date of claim 1 wherein the first Uber financial transaction category analysis display region includes either:
  a first Uber financial transaction category analysis number indicating the calculated average first Uber financial transaction category first category time period amount minus a cumulative amount of financial transactions associated with a user mapped to the first Uber financial transaction category in a specified time since the last calculation of the Uber financial transaction category analysis number if the current time is determined to be in the first category time period; or
  a first Uber financial transaction category analysis number calculated indicating the calculated average first Uber financial transaction category second category time period amount minus a cumulative amount of financial transactions associated with a user mapped to the first Uber financial transaction category in a specified time since the last calculation of the Uber financial transaction category analysis number if the current time is determined to be in the second category time period.

13. The method for providing a spending analysis display dynamically adapted to defined categories of day and/or date of claim 1 wherein the user computing system is a computing system selected from the group of computing systems consisting of:
  a wearable computing system;
  a mobile computing system;
  a smart phone;
  a notebook computing system;
  a tablet computing system;
  a laptop computing system;
  a desktop computing system; and
  a server computing system.

14. A system for providing a spending analysis display dynamically adapted to defined categories of day and/or date comprising:
  first category time period data representing one or more first category time periods;
  second category time period data representing one or more second category time periods, the second category time periods being distinct from the first category time periods;
  comparison timeframe data representing a comparison timeframe, the comparison timeframe including one or more first category time periods and/or one or more second category time periods;

a comparison timeframe first category time period number determination module for calculating a comparison timeframe first category time period number by determining the number of first category time periods that occurred in the defined comparison timeframe;

a comparison timeframe second category time period number determination module for calculating a comparison timeframe second category time period number by determining the number of second category time periods that occurred in the defined comparison timeframe;

first Uber financial transaction category data representing a first Uber financial transaction category;

financial transaction data representing one or more financial transactions associated with a user conducted during the comparison timeframe;

an analysis module for analyzing the financial transaction data to identify one or more financial transactions associated with a user conducted during the one or more first category time periods that occurred in the defined comparison timeframe and that are mapped to the first Uber financial transaction category;

an analysis module for analyzing the financial transaction data to identify one or more financial transactions associated with the user conducted during the one or more second category time periods that occurred in the defined comparison timeframe and that are mapped to the first Uber financial transaction category;

a first Uber financial transaction category first category time period cumulative amount calculation module for calculating a first Uber financial transaction category first category time period cumulative amount by determining the total cumulative amount of the one or more financial transactions associated with a user mapped to the first Uber financial transaction category that were conducted during the one or more first category time periods of the comparison timeframe;

first Uber financial transaction category second category time period cumulative amount calculation module for calculating a first Uber financial transaction category second category time period cumulative amount by determining the total cumulative amount of the one or more financial transactions associated with a user mapped to the first Uber financial transaction category that were conducted during the one or more second category time periods of the comparison timeframe;

an average first Uber financial transaction category first category time period amount calculation module for calculating an average first Uber financial transaction category first category time period amount by dividing the first Uber financial transaction category first category time period cumulative amount by the comparison timeframe first category time period number;

an average first Uber financial transaction category second category time period amount calculation module for calculating an average first Uber financial transaction category second category time period amount by dividing the first Uber financial transaction category second category time period cumulative amount by the comparison timeframe second category time period number;

a time period determination module for determining whether a current time is in the first category time period or the second category time period for the user;

a spending analysis display generation module for generating a spending analysis display, the spending analysis display including a first Uber financial transaction category analysis display region, the spending analysis display being further configured to display a swipe input display which is configured to receive user input in the form of a swiping motion to either the left or right, wherein categorization of an uncategorized transaction is made into a wants category if user input is received of a swiping motion is made in a first direction of either left or right, and categorization of an uncategorized transaction is instead made into a needs category if user input is received of a swiping motion is made in a second direction, the first Uber financial transaction category analysis display region including either:

a first Uber financial transaction category analysis number calculated based on the calculated average first Uber financial transaction category first category time period amount if the current time is determined to be in the first category time period; or a first Uber financial transaction category analysis number calculated based on the calculated average first Uber financial transaction category second category time period amount if the current time is determined to be in the second category time period; and a user computing system, the spending analysis display being provided to the user a display screen of the user computing system.

15. The system for providing a spending analysis display dynamically adapted to defined categories of day and/or date of claim 14 wherein at least one of the one or more first category time periods are selected from the group of first category time periods consisting of:

specified hours of the day;
specified hours of a specified day;
a specified day;
specified days of the week;
specified days of a specified week;
specified days of one or more specified weeks;
specified days of a month;
specified days of a specified month;
specified weeks of a month;
specified days of one or more specified months;
specified weeks of one or more specified months;
a specified month;
one or more specified months;
a specified month of a specified year;
one or more specified months of a specified year;
a specified month of one or more specified years;
one or more specified months of one or more specified years;
a specified year; and
one or more specified years.

16. The system for providing a spending analysis display dynamically adapted to defined categories of day and/or date of claim 14 wherein at least one of the one or more second category time periods are selected from the group of second category time periods that are distinct from the selected first category time periods consisting of:

specified hours of the day;
specified hours of a specified day;
a specified day;
specified days of the week;
specified days of a specified week;
specified days of one or more specified weeks;
specified days of a month;
specified days of a specified month;
specified weeks of a month;
specified days of one or more specified months;

specified weeks of one or more specified months;
a specified month;
one or more specified months;
a specified month of a specified year;
one or more specified months of a specified year;
a specified month of one or more specified years;
one or more specified months of one or more specified years;
a specified year; and
one or more specified years.

17. The system for providing a spending analysis display dynamically adapted to defined categories of day and/or date of claim 14 wherein the comparison timeframe includes at least one of the one or more first category time periods and/or at least one of the one or more second category time periods and is selected from the group of comparison timeframes consisting of:
specified hours of the day;
specified hours of a specified day;
a specified day;
specified days of the week;
specified days of a specified week;
specified days of one or more specified weeks;
specified days of a month;
specified days of a specified month;
specified weeks of a month;
specified days of one or more specified months;
specified weeks of one or more specified months;
a specified month;
one or more specified months;
a specified month of a specified year;
one or more specified months of a specified year;
a specified month of one or more specified years;
one or more specified months of one or more specified years;
a specified year; and
one or more specified years.

18. The system for providing a spending analysis display dynamically adapted to defined categories of day and/or date of claim 14 wherein the first Uber financial transaction category is selected from the group of Uber financial transaction category consisting of:
a discretionary spending Uber financial transaction category;
a non-discretionary spending Uber financial transaction category;
a wants spending Uber financial transaction category
a needs spending Uber financial transaction category;
a good spending Uber financial transaction category;
a bad spending Uber financial transaction category;
a worth it Uber financial transaction category;
a not worth it Uber financial transaction category;
a would repeat Uber financial transaction category; and
a would not repeat Uber financial transaction category.

19. The system for providing a spending analysis display dynamically adapted to defined categories of day and/or date of claim 14 wherein the financial transaction data representing one or more financial transactions associated with a user conducted during the comparison timeframe is obtained from a financial management system selected from the group of financial management systems consisting of:
a computing system implemented financial management system;
a network accessed financial management system;
a web-based financial management system; and
a cloud-based financial management system.

20. The system for providing a spending analysis display dynamically adapted to defined categories of day and/or date of claim 14 wherein identifying one or more financial transactions associated with a user conducted during the one or more first category time periods that occurred in the defined comparison timeframe and that are mapped to the first Uber financial transaction category and identifying one or more financial transactions associated with a user conducted during the one or more second category time periods that occurred in the defined comparison timeframe and that are mapped to the first Uber financial transaction category is performed by a financial management system.

21. The system for providing a spending analysis display dynamically adapted to defined categories of day and/or date of claim 20 wherein the financial management system is selected from the group of financial management systems consisting of:
a computing system implemented financial management system;
a network accessed financial management system;
a web-based financial management system; and
a cloud-based financial management system.

22. The system for providing a spending analysis display dynamically adapted to defined categories of day and/or date of claim 14 wherein determining whether a current time is in the first category time period or the second category time period is performed based on time data obtained from the user computing system and/or a GPS function associated with the user computing system.

23. The system for providing a spending analysis display dynamically adapted to defined categories of day and/or date of claim 14 wherein the first Uber financial transaction category analysis display region includes a graphical display selected from the group of graphical displays consisting of:
a first color graphic;
a first icon graphic;
a first animated graphic;
a first shape graphic;
a first symbol graphic;
a first alpha-numeric graphic; and
a first avatar graphic.

24. The system for providing a spending analysis display dynamically adapted to defined categories of day and/or date of claim 14 wherein the first Uber financial transaction category analysis display region includes either:
a first Uber financial transaction category analysis number indicating the calculated average first Uber financial transaction category first category time period amount if the current time is determined to be in the first category time period; or
a first Uber financial transaction category analysis number calculated indicating the calculated average first Uber financial transaction category second category time period amount if the current time is determined to be in the second category time period.

25. The system for providing a spending analysis display dynamically adapted to defined categories of day and/or date of claim 14 wherein the first Uber financial transaction category analysis display region includes either:
a first Uber financial transaction category analysis number indicating the calculated average first Uber financial transaction category first category time period amount minus a cumulative amount of financial transactions associated with a user mapped to the first Uber financial transaction category in a specified time since the last calculation of the Uber financial transaction category analysis number if the current time is determined to be in the first category time period; or a first Uber financial transaction category analysis number calculated indicating the calculated average first Uber financial transaction category second category time period amount minus a cumulative amount of financial transactions associated with a user mapped to the first Uber financial transaction category in a specified time since the last calculation of the Uber financial transaction category analysis number if the current time is determined to be in the second category time period.

26. The system for providing a spending analysis display dynamically adapted to defined categories of day and/or date of claim 14 wherein the user computing system is a computing system selected from the group of computing systems consisting of:
a wearable computing system;
a mobile computing system;
a smart phone;
a notebook computing system;
a tablet computing system;
a laptop computing system;
a desktop computing system; and
a server computing system.

27. A method for providing a spending analysis display dynamically adapted to defined categories of day and/or date comprising:
defining one or more user work time periods;
defining one or more user non-work time periods;
defining a comparison timeframe, the comparison timeframe including one or more work time periods and/or one or more non-work time periods;
calculating a comparison timeframe work time period number by determining the number of work time periods that occurred in the defined comparison timeframe;
calculating a comparison timeframe non-work time period number by determining the number of non-work time periods that occurred in the defined comparison timeframe;
defining a first Uber financial transaction category;
obtaining financial transaction data representing one or more financial transactions associated with a user conducted during the comparison timeframe;
identifying one or more financial transactions associated with a user conducted during the one or more work time periods that occurred in the defined comparison timeframe and that are mapped to the first Uber financial transaction category;
identifying one or more financial transactions associated with the user conducted during the one or more non-work time periods that occurred in the defined comparison timeframe and that are mapped to the first Uber financial transaction category;
calculating a first Uber financial transaction category work time period cumulative amount by determining the total cumulative amount of the one or more financial transactions associated with a user mapped to the first Uber financial transaction category that were conducted during the one or more work time periods of the comparison timeframe;
calculating a first Uber financial transaction category non-work time period cumulative amount by determining the total cumulative amount of the one or more financial transactions associated with a user mapped to the first Uber financial transaction category that were conducted during the one or more non-work time periods of the comparison timeframe;
calculating an average first Uber financial transaction category work time period amount by dividing the first Uber financial transaction category work time period cumulative amount by the comparison timeframe work time period number;
calculating an average first Uber financial transaction category non-work time period amount by dividing the first Uber financial transaction category non-work time period cumulative amount by the comparison timeframe non-work time period number;
determining whether a current time is in the work time period or the non-work time period for the user;
generating a spending analysis display, the spending analysis display including a first Uber financial transaction category analysis display region, the spending analysis display being further configured to display a swipe input display which is configured to receive user input in the form of a swiping motion to either the left or right, wherein categorization of an uncategorized transaction is made into a wants category if user input is received of a swiping motion is made in a first direction of either left or right, and categorization of an uncategorized transaction is instead made into a needs category if user input is received of a swiping motion is made in a second direction, the first Uber financial transaction category analysis display region including either:
a first Uber financial transaction category analysis number calculated based on the calculated average first Uber financial transaction category work time period amount if the current time is determined to be in the work time period; or
a first Uber financial transaction category analysis number calculated based on the calculated average first Uber financial transaction category non-work time period amount if the current time is determined to be in the non-work time period; and
providing the spending analysis display to the user on a display screen of a user computing system.

28. The method for providing a spending analysis display dynamically adapted to defined categories of day and/or date of claim 27 wherein at least one of the one or more work time periods are selected from the group of work time periods consisting of:
specified hours of the day;
specified hours of a specified day;
a specified day;
specified days of the week;
specified days of a specified week;
specified days of one or more specified weeks;
specified days of a month;
specified days of a specified month;
specified weeks of a month;
specified days of one or more specified months;
specified weeks of one or more specified months;
a specified month;
one or more specified months;
a specified month of a specified year;
one or more specified months of a specified year;
a specified month of one or more specified years;
one or more specified months of one or more specified years;
a specified year; and
one or more specified years.

29. The method for providing a spending analysis display dynamically adapted to defined categories of day and/or date of claim 27 wherein at least one of the one or more non-work time periods are selected from the group of non-work time periods that are distinct from the selected work time periods consisting of:
- specified hours of the day;
- specified hours of a specified day;
- a specified day;
- specified days of the week;
- specified days of a specified week;
- specified days of one or more specified weeks;
- specified days of a month;
- specified days of a specified month;
- specified weeks of a month;
- specified days of one or more specified months;
- specified weeks of one or more specified months;
- a specified month;
- one or more specified months;
- a specified month of a specified year;
- one or more specified months of a specified year;
- a specified month of one or more specified years;
- one or more specified months of one or more specified years;
- a specified year; and
- one or more specified years.

30. The method for providing a spending analysis display dynamically adapted to defined categories of day and/or date of claim 27 wherein the comparison timeframe includes at least one of the one or more work time periods and/or at least one of the one or more non-work time periods and is selected from the group of comparison timeframes consisting of:
- specified hours of the day;
- specified hours of a specified day;
- a specified day;
- specified days of the week;
- specified days of a specified week;
- specified days of one or more specified weeks;
- specified days of a month;
- specified days of a specified month;
- specified weeks of a month;
- specified days of one or more specified months;
- specified weeks of one or more specified months;
- a specified month;
- one or more specified months;
- a specified month of a specified year;
- one or more specified months of a specified year;
- a specified month of one or more specified years;
- one or more specified months of one or more specified years;
- a specified year; and
- one or more specified years.

31. The method for providing a spending analysis display dynamically adapted to defined categories of day and/or date of claim 27 wherein the first Uber financial transaction category is selected from the group of Uber financial transaction category consisting of:
- a discretionary spending Uber financial transaction category;
- a non-discretionary spending Uber financial transaction category;
- a wants spending Uber financial transaction category
- a needs spending Uber financial transaction category;
- a good spending Uber financial transaction category;
- a bad spending Uber financial transaction category;
- a worth it Uber financial transaction category;
- a not worth it Uber financial transaction category;
- a would repeat Uber financial transaction category; and
- a would not repeat Uber financial transaction category.

32. The method for providing a spending analysis display dynamically adapted to defined categories of day and/or date of claim 27 wherein the financial transaction data representing one or more financial transactions associated with a user conducted during the comparison timeframe is obtained from a financial management system selected from the group of financial management systems consisting of:
- a computing system implemented financial management system;
- a network accessed financial management system;
- a web-based financial management system; and
- a cloud-based financial management system.

33. The method for providing a spending analysis display dynamically adapted to defined categories of day and/or date of claim 27 wherein identifying one or more financial transactions associated with a user conducted during the one or more work time periods that occurred in the defined comparison timeframe and that are mapped to the first Uber financial transaction category and identifying one or more financial transactions associated with a user conducted during the one or more non-work time periods that occurred in the defined comparison timeframe and that are mapped to the first Uber financial transaction category is performed by a financial management system.

34. The method for providing a spending analysis display dynamically adapted to defined categories of day and/or date of claim 33 wherein the financial management system is selected from the group of financial management systems consisting of:
- a computing system implemented financial management system;
- a network accessed financial management system;
- a web-based financial management system; and
- a cloud-based financial management system.

35. The method for providing a spending analysis display dynamically adapted to defined categories of day and/or date of claim 27 wherein determining whether a current time is in the work time period or the non-work time period is performed based on time data obtained from the user computing system and/or a GPS function associated with the user computing system.

36. The method for providing a spending analysis display dynamically adapted to defined categories of day and/or date of claim 27 wherein the first Uber financial transaction category analysis display region includes a graphical display selected from the group of graphical displays consisting of:
- a first color graphic;
- a first icon graphic;
- a first animated graphic;
- a first shape graphic;
- a first symbol graphic;
- a first alpha-numeric graphic; and
- a first avatar graphic.

37. The method for providing a spending analysis display dynamically adapted to defined categories of day and/or date of claim 27 wherein the first Uber financial transaction category analysis display region includes either:
- a first Uber financial transaction category analysis number indicating the calculated average first Uber financial transaction category work time period amount if the current time is determined to be in the work time period; or
- a first Uber financial transaction category analysis number calculated indicating the calculated average first Uber financial transaction category non-work time period amount if the current time is determined to be in the non-work time period.

38. The method for providing a spending analysis display dynamically adapted to defined categories of day and/or date of claim 27 wherein the first Uber financial transaction category analysis display region includes either:
   a first Uber financial transaction category analysis number indicating the calculated average first Uber financial transaction category work time period amount minus a cumulative amount of financial transactions associated with a user mapped to the first Uber financial transaction category in a specified time since the last calculation of the Uber financial transaction category analysis number if the current time is determined to be in the work time period; or
   a first Uber financial transaction category analysis number calculated indicating the calculated average first Uber financial transaction category non-work time period amount minus a cumulative amount of financial transactions associated with a user mapped to the first Uber financial transaction category in a specified time since the last calculation of the Uber financial transaction category analysis number if the current time is determined to be in the non-work time period.

39. The method for providing a spending analysis display dynamically adapted to defined categories of day and/or date of claim 27 wherein the user computing system is a computing system selected from the group of computing systems consisting of:
   a wearable computing system;
   a mobile computing system;
   a smart phone;
   a notebook computing system;
   a tablet computing system;
   a laptop computing system;
   a desktop computing system; and
   a server computing system.

40. A method for providing a spending analysis display dynamically adapted to defined categories of day and/or date comprising:
   defining one or more user work days;
   defining one or more user non-user work days;
   defining a comparison timeframe, the comparison timeframe including one or more user work days and/or one or more user non-user work days;
   calculating a comparison timeframe user work day number by determining the number of user work days that occurred in the defined comparison timeframe;
   calculating a comparison timeframe user non-work day number by determining the number of user non-work days that occurred in the defined comparison timeframe;
   defining a discretionary spending Uber financial transaction category;
   obtaining financial transaction data representing one or more financial transactions associated with the user conducted during the comparison timeframe;
   identifying one or more financial transactions associated with a user conducted during the one or more user work days that occurred in the defined comparison timeframe and that are mapped to the discretionary spending Uber financial transaction category;
   identifying one or more financial transactions associated with the user conducted during the one or more user non-work days that occurred in the defined comparison timeframe and that are mapped to the discretionary spending Uber financial transaction category;
   calculating a discretionary spending Uber financial transaction category user work day cumulative amount by determining the total cumulative amount of the one or more financial transactions associated with a user mapped to the discretionary spending Uber financial transaction category that were conducted during the one or more user work days of the comparison timeframe;
   calculating a discretionary spending Uber financial transaction category user non-work day cumulative amount by determining the total cumulative amount of the one or more financial transactions associated with a user mapped to the discretionary spending Uber financial transaction category that were conducted during the one or more user non-work days of the comparison timeframe;
   calculating an average discretionary spending Uber financial transaction category user work day amount by dividing the discretionary spending Uber financial transaction category user work day cumulative amount by the comparison timeframe user work day number;
   calculating an average discretionary spending Uber financial transaction category user non-work day amount by dividing the discretionary spending Uber financial transaction category user non-work day cumulative amount by the comparison timeframe user non-work day number;
   determining whether a current time is in the user work day or the user non-work day;
   generating a spending analysis display, the spending analysis display including a discretionary spending Uber financial transaction category analysis display region, the spending analysis display being further configured to display a swipe input display which is configured to receive user input in the form of a swiping motion to either the left or right, wherein categorization of an uncategorized transaction is made into a wants category if user input is received of a swiping motion is made in a first direction of either left or right, and categorization of an uncategorized transaction is instead made into a needs category if user input is received of a swiping motion is made in a second direction, the discretionary spending Uber financial transaction category analysis display region including either:
   a discretionary spending Uber financial transaction category analysis number calculated based on the calculated average discretionary spending Uber financial transaction category user work day amount if the current time is determined to be in the user work day; or
   a discretionary spending Uber financial transaction category analysis number calculated based on the calculated average discretionary spending Uber financial transaction category user non-work day amount if the current time is determined to be in the user non-work day; and
   providing the spending analysis display to the user on a display screen of a user computing system.

41. The method for providing a spending analysis display dynamically adapted to defined categories of day and/or date of claim 40 wherein the user work days are weekdays and the user non-work days are weekend days.

42. The method for providing a spending analysis display dynamically adapted to defined categories of day and/or date of claim 40 wherein the comparison timeframe is selected from the group of comparison timeframes consisting of:
- specified hours of the day;
- specified hours of a specified day;
- a specified day;
- specified days of the week;
- specified days of a specified week;
- specified days of one or more specified weeks;
- specified days of a month;
- specified days of a specified month;
- specified weeks of a month;
- specified days of one or more specified months;
- specified weeks of one or more specified months;
- a specified month;
- one or more specified months;
- a specified month of a specified year;
- one or more specified months of a specified year;
- a specified month of one or more specified years;
- one or more specified months of one or more specified years;
- a specified year; and
- one or more specified years.

43. The method for providing a spending analysis display dynamically adapted to defined categories of day and/or date of claim 40 wherein the financial transaction data representing one or more financial transactions associated with a user conducted during the comparison timeframe is obtained from a financial management system selected from the group of financial management systems consisting of:
- a computing system implemented financial management system;
- a network accessed financial management system;
- a web-based financial management system; and
- a cloud-based financial management system.

44. The method for providing a spending analysis display dynamically adapted to defined categories of day and/or date of claim 40 wherein identifying one or more financial transactions associated with a user conducted during the user work days that occurred in the defined comparison timeframe and that are mapped to the discretionary spending Uber financial transaction category and identifying one or more financial transactions associated with a user conducted during the non-work days that occurred in the defined comparison timeframe and that are mapped to the discretionary spending Uber financial transaction category is performed by a financial management system.

45. The method for providing a spending analysis display dynamically adapted to defined categories of day and/or date of claim 44 wherein the financial management system is selected from the group of financial management systems consisting of:
- a computing system implemented financial management system;
- a network accessed financial management system;
- a web-based financial management system; and
- a cloud-based financial management system.

46. The method for providing a spending analysis display dynamically adapted to defined categories of day and/or date of claim 40 wherein determining whether a current time is in the work day or the non-work day is performed based on time data obtained from the user computing system and/or a GPS function associated with the user computing system.

47. The method for providing a spending analysis display dynamically adapted to defined categories of day and/or date of claim 40 wherein the discretionary spending Uber financial transaction category analysis display region includes a graphical display selected from the group of graphical displays consisting of:
- a first color graphic;
- a first icon graphic;
- a first animated graphic;
- a first shape graphic;
- a first symbol graphic;
- a first alpha-numeric graphic; and
- a first avatar graphic.

48. The method for providing a spending analysis display dynamically adapted to defined categories of day and/or date of claim 40 wherein the discretionary spending Uber financial transaction category analysis display region includes either:
- a discretionary spending Uber financial transaction category analysis number indicating the calculated average discretionary spending Uber financial transaction category user work day amount if the current time is determined to be in the user work day; or
- a discretionary spending Uber financial transaction category analysis number calculated indicating the calculated average discretionary spending Uber financial transaction category user non-work day amount if the current time is determined to be in the user non-work day.

49. The method for providing a spending analysis display dynamically adapted to defined categories of day and/or date of claim 40 wherein the discretionary spending Uber financial transaction category analysis display region includes either:
- a discretionary spending Uber financial transaction category analysis number indicating the calculated average discretionary spending Uber financial transaction category user work day amount minus a cumulative amount of financial transactions associated with a user mapped to the discretionary spending Uber financial transaction category in a specified time since the last calculation of the Uber financial transaction category analysis number if the current time is determined to be in the user work day; or
- a discretionary spending Uber financial transaction category analysis number calculated indicating the calculated average discretionary spending Uber financial transaction category user non-work day amount minus a cumulative amount of financial transactions associated with a user mapped to the discretionary spending Uber financial transaction category in a specified time since the last calculation of the Uber financial transaction category analysis number if the current time is determined to be in the user non-work day.

50. The method for providing a spending analysis display dynamically adapted to defined categories of day and/or date of claim 40 wherein the user computing system is a computing system selected from the group of computing systems consisting of:
- a wearable computing system;
- a mobile computing system;
- a smart phone;
- a notebook computing system;
- a tablet computing system;
- a laptop computing system;
- a desktop computing system; and
- a server computing system.

* * * * *